(12) United States Patent
Ozeki et al.

(10) Patent No.: US 7,206,728 B2
(45) Date of Patent: Apr. 17, 2007

(54) METHOD FOR EVALUATING THERMAL COMFORT OF A STRUCTURE AND AN ASSISTING METHOD, PROGRAM OR SYSTEM FOR DESIGNING A STRUCTURE IN CONSIDERATION OF THERMAL COMFORT

(75) Inventors: Yoshiichi Ozeki, Kanagawa (JP); Toru Takabayashi, Kanagawa (JP); Shinichi Tanabe, Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 637 days.

(21) Appl. No.: 10/669,556

(22) Filed: Sep. 25, 2003

(65) Prior Publication Data

US 2004/0133406 A1 Jul. 8, 2004

(30) Foreign Application Priority Data

Sep. 25, 2002 (JP) ............................ 2002-279695

(51) Int. Cl.
*G06F 17/10* (2006.01)
*G06F 17/50* (2006.01)

(52) U.S. Cl. ............................................ 703/2; 703/1

(58) Field of Classification Search .................. 703/2, 703/1; 52/145, 203; 126/628; 73/204.11; 700/1, 276, 299; 702/130; 236/46 R; 374/109
See application file for complete search history.

(56) References Cited

U.S. PATENT DOCUMENTS

| | | | | |
|---|---|---|---|---|
| 4,198,796 A | * | 4/1980 | Foster .......................... | 52/203 |
| 4,448,187 A | * | 5/1984 | Stulken ........................ | 126/628 |
| 5,324,112 A | * | 6/1994 | Palazzetti et al. ............ | 374/109 |
| 6,351,914 B1 | * | 3/2002 | Sobek ........................... | 52/145 |
| 6,595,430 B1 | * | 7/2003 | Shah ............................ | 236/46 R |
| 6,996,490 B2 | * | 2/2006 | Canta et al. .................. | 702/130 |
| 2003/0208282 A1 | * | 11/2003 | Shah ............................... | 700/1 |
| 2005/0126280 A1 | * | 6/2005 | Canta et al. ............... | 73/204.11 |

FOREIGN PATENT DOCUMENTS

| | | |
|---|---|---|
| JP | 10-239161 | 9/1998 |
| JP | 2001-155052 | 6/2001 |

OTHER PUBLICATIONS

Saitoh et al., T.S. Three-Dimensional Simulation for Urban Warming in Tokyo and Proposal of an Environmental Index for Urban Outdoor Comfort, Proceedings of the 32nd Intersociety Energy Conversion Engineering Conference, vol. 3, Jul.-Aug. 1997, pp. 2-76-81.*

(Continued)

*Primary Examiner*—Russell Frejd
(74) *Attorney, Agent, or Firm*—Oblon, Spivak, McClelland, Maier & Neustadt, P.C.

(57) ABSTRACT

A step of preparing data of (1) material properties of a first part and so on and data of (2) an amount of solar radiation passing through the translucent member to reach a measuring device having a shape imitating a human body part, an amount of solar radiation to the structure, an amount of convection heat transfer in the structure, an amount of radiation heat transfer in the structure, humidity in the structure and/or a thermo-regulating function of the measuring device, and calculating at least one of the amount of heat loss from the surface of the measuring device, the temperature of the measuring device and/or the wettedness at the surface of the measuring device based on at least one in each of data (1) and (2), and a step (b) of calculating a thermal comfort index of the measuring device by using a result of the above calculation, are presented, whereby the thermal comfort of a structure is evaluated without using a laboratory equipment.

23 Claims, 15 Drawing Sheets

*1: Operation part
*2: Evaluation part
*3: Selection part

OTHER PUBLICATIONS

A.P. Gagge, Ph.D., et al., "A Standard Predictive Index of Human Response to the Thermal Environment", ASHRAE Transactions, vol. 92, 1986, pp. 709-731.

Shin-ichi Tanabe, et al., "Evaluation of Thermal Comfort Using Combined Multi-Node Thermoregulation (65MN) and Radiation Models and Computational Fluid Dynamics (CFD)", Energy & Buildings-Special Issue, 2002, 5 pages.

G. Fonzes, et al., "Athebes, A Car Thermal Behavior Simulation Software", ATA-Ingegneria Automotoristica, vol. 49, No. 3, 1996, pp. 128-133.

* cited by examiner

*1: Operation part
*2: Evaluation part
*3: Selection part

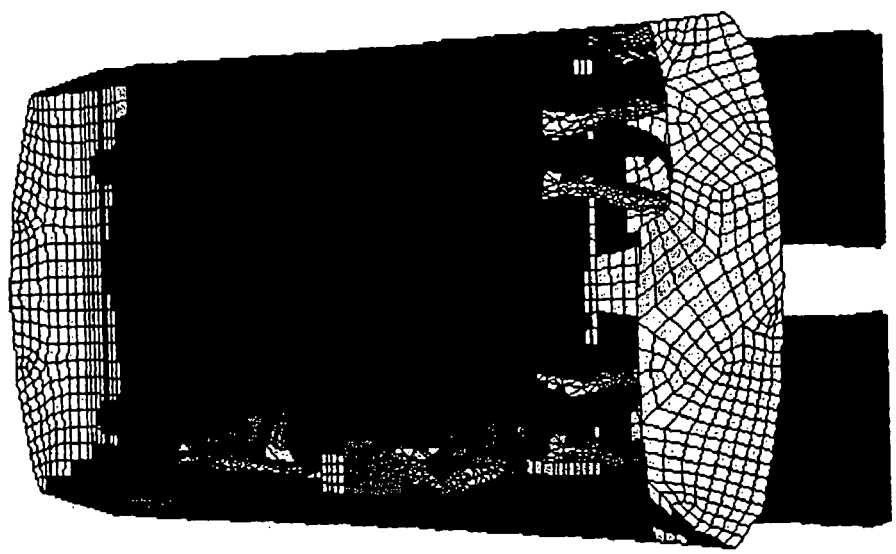
Fig. 4(b) Type II
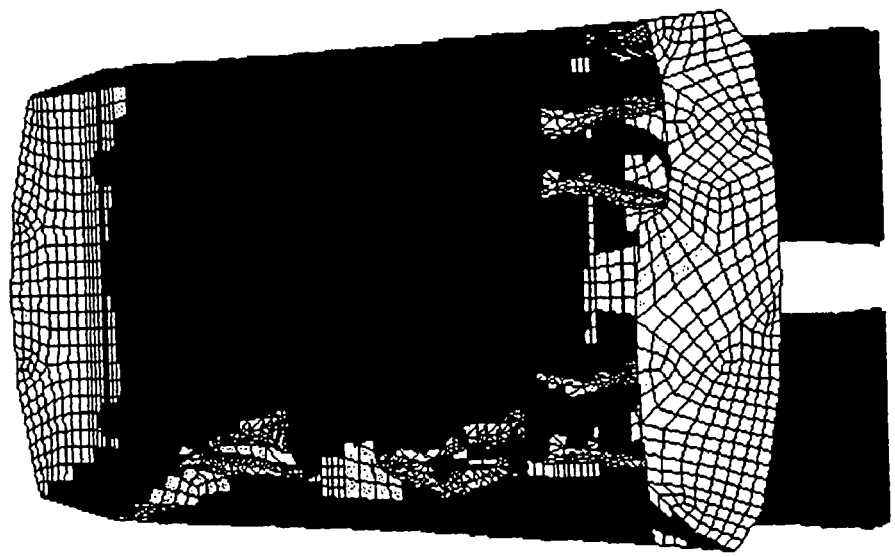
Fig. 4(a) Type I

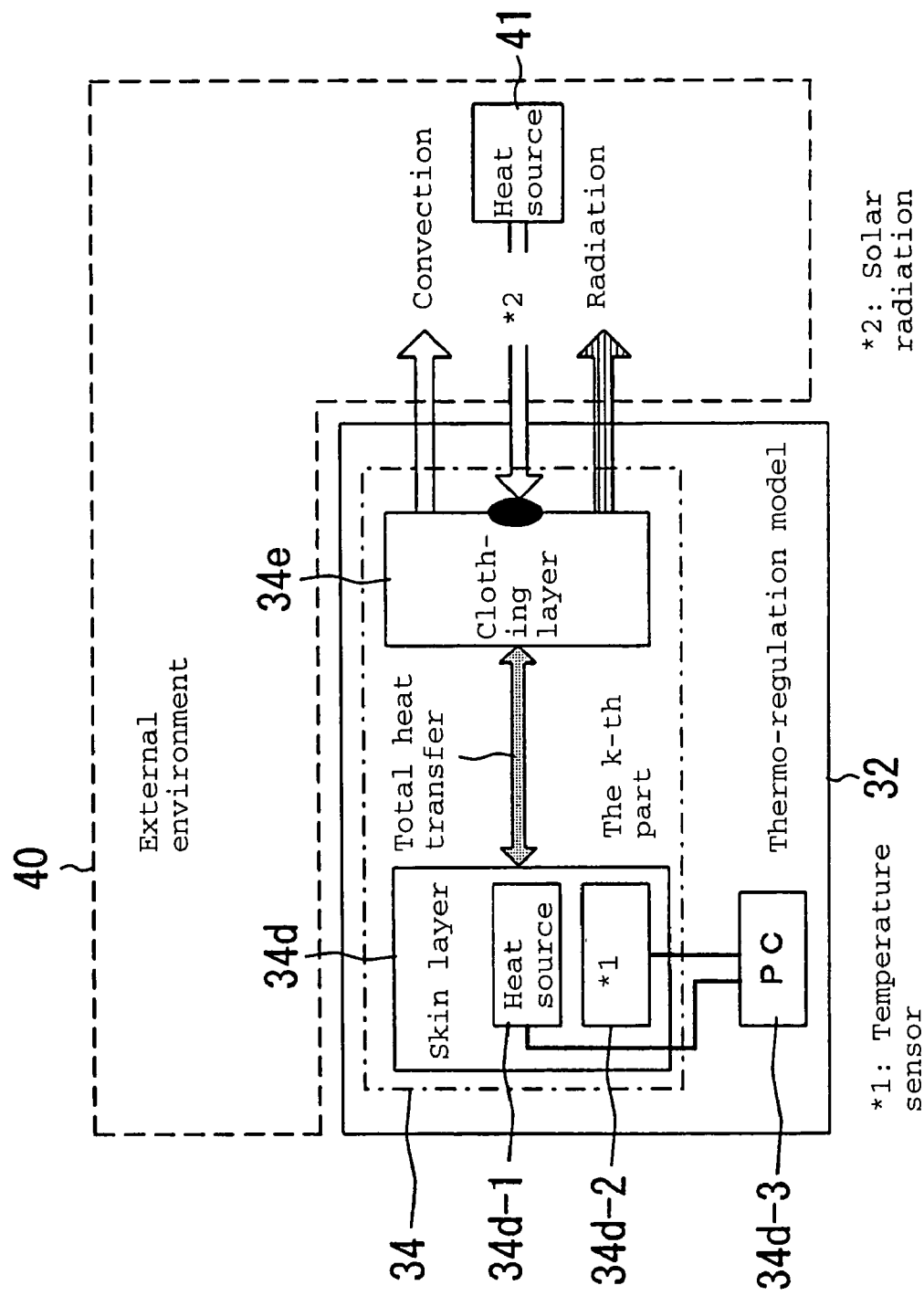

*1: Sky-diffused solar radiation
*2: direct solar radiation
*3: Reflection of solar radiation on the ground
*4: internal diffused reflection of solar radiation Transparent glass sheet having a thickness of 3 mm with a solar reflection film Fig.14
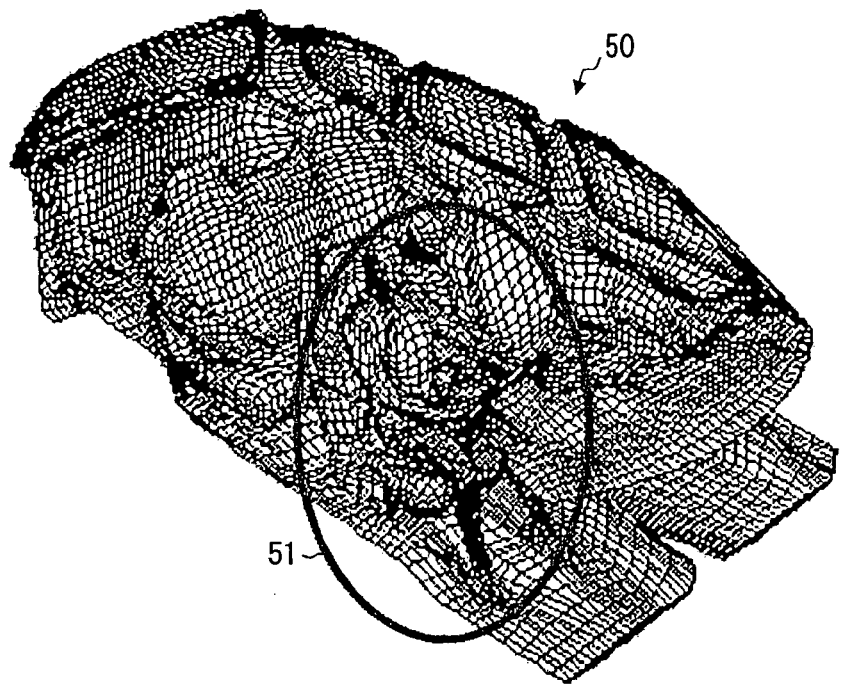
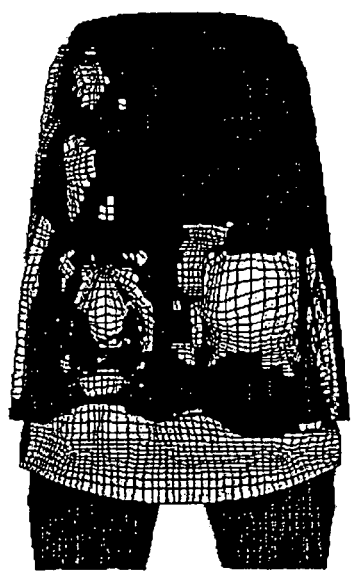
Case of using solar radiation
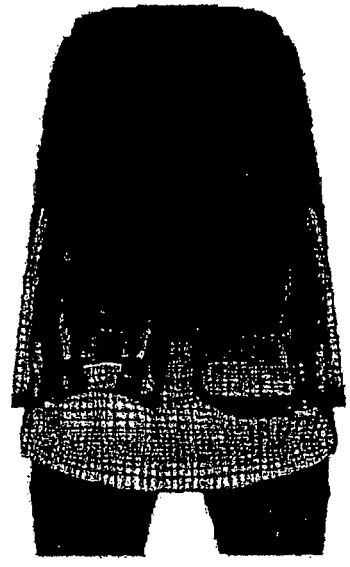
Case of using infrared lamps
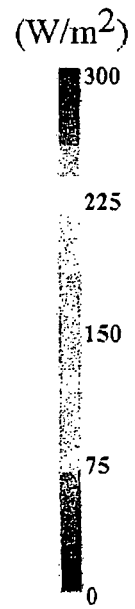
(W/m²)
Fig.15(a)   Fig.15(b)

METHOD FOR EVALUATING THERMAL COMFORT OF A STRUCTURE AND AN ASSISTING METHOD, PROGRAM OR SYSTEM FOR DESIGNING A STRUCTURE IN CONSIDERATION OF THERMAL COMFORT

BACKGROUND OF THE INVENTION

1. Field of the Invention

The present invention relates to a method for evaluating thermal comfort of a structure and an assisting method, program or system for designing a structure in consideration of thermal comfort. In particular, it relates to a method for evaluating thermal comfort of a structure and an assisting method, program or system for designing a structure based on thermophysical properties of a translucent member (such as a window glass sheet, a glass plate used as an outer wall of an atrium, a plastic plate, a plastic film or the like) used for a structure (such as a vehicle, a train, a ship, an aircraft, a space shuttle, a building and so on) and each part (such as a wall or floor material) constituting the structure, and based on a shape of each part.

2. Discussion of Background

It has been known that thermal environment in a vehicle or a building changes largely by the influence of solar radiation incident through window glass sheets. In order to control such influence of solar radiation, various articles such as a solar reflection glass sheet, a solar absorption glass sheet, an insulated glazing glass sheet and so on are presented by glass manufacturers.

These glass sheets are generally evaluated based on an insulation performance such as a transmittance of solar radiation, a gain of solar heat and so on ruled in JIS R 3106. However, when the insulation performance is evaluated by only physical characteristics of glass itself, it is difficult to know thermal sensation that a human feels actually. As an attempt of solving such problem, there is a proposal that a thermal manikin formed in consideration of heat generated from a human body (a dummy doll for reproducing thermal characteristics of a human) is prepared and a heat loss from each human part (such as a head part, a chest part, arms, legs or the like) is measured by using the thermal manikin to examine the thermal sensation.

However, even when such thermal manikin is used, it is difficult to examine individually a thermal effect that each part (a window glass sheet, a seat or the like) constituting a vehicle body affects a passenger. In the conventional technique, there is no way other than the study of the influence obtained by considering all factors of solar irradiation transmitting through window glass sheets, and radiation and convection on each part. Accordingly, it was difficult to examine quantitatively contribution of each part, and it was difficult to select the material, property or shape of each part which can provide the optimum thermal comfort in the passenger compartment.

Further, even though the thermal effect of each part could be examined by using the thermal manikin, an actual examination was not easy because a prototype of a room or the passenger compartment of a vehicle was required in order to evaluate the thermal environment of the room or passenger compartment. Further, the thermal manikin is a very expensive device because it is provided with a large number of sensors and heat sources to reproduce the thermo-regulating function of a human. A patent document 1 (JP-A-2001-155052, p. 1–7) discloses a method for selecting a glass sheet and a patent document 2 (JP-A-10-239161, p. 1–8) discloses a technique of simulating thermal environment. However, these documents do not disclose that simulation is conducted in consideration of a precise shape of human body.

It is an object of the present invention to provide a method for evaluating thermal comfort of a structure and an assisting method, program or system for designing a structure in consideration of thermal comfort, which can easily be carried out without requiring a laboratory equipment such as a prototype.

SUMMARY OF THE INVENTION

The present invention is provided in order to achieve the above-mentioned object.

In accordance with a first aspect of the present invention, there is provided a method for evaluating thermal comfort of a structure constituted by a first, second, ... n-th part (n is a natural number of at least two) wherein at least one of these parts is a translucent member for introducing light to the inside, the method for evaluating thermal comfort of a structure comprising:

a step (a) of preparing data of (1) the material property of the first part, the material property of the second part, ... the material property of the n-th part, and data of (2) an mount of solar radiation passing through the translucent member to reach a measuring device having a shape imitating a human body part, an amount of solar radiation to the structure, an amount of convection heat transfer in the structure, an amount of radiation heat transfer in the structure, humidity in the structure and/or a thermo-regulating function of the measuring device, and calculating at least one of the amount of heat loss from the surface of the measuring device, the temperature of the measuring device and/or the wettedness at the surface of the measuring device based on at least one in each of data (1) and (2), and a step (b) of calculating a thermal comfort index of the measuring device by using a result of the above calculation.

According to a second aspect of the present invention, there is provided an assisting method for designing a structure in consideration of thermal comfort, the structure being constituted by a first, a second, ... an n-th part (n is a natural number of at least two) wherein at least one of these parts is a translucent member for introducing light to the inside, the assisting method for designing a structure comprising:

a step (a) of preparing at least one candidate value for each of the material property of the first part, the material property of the second part, ... the material property of the n-th part, and registering candidate values of material properties of these parts in a predetermined data base, a step (b) of selecting and reading the material property registered in said data base for each part, and preparing at least one combination among the registered material properties, calculating at least one of the amount of heat loss from the surface of the measuring device, the temperature of the measuring device and/or the wettedness at the surface of the measuring device based on at least one in each of data (1) combinations of material properties thus prepared and (2) an mount of solar radiation passing through the translucent member to reach the measuring device having a shape imitating a human body part, an amount of solar radiation to the structure, an amount of convection heat transfer in the structure, an amount of radiation heat transfer in the structure, humidity in the structure and/or a thermo-regulating function of the measuring device, and calculating a thermal comfort index of the measuring device by using a result of the above calculation, and a step (c) of selecting a combination of material properties having a value closest to the optimum thermal comfort index.

According to a third aspect of the present invention, there is provided a thermal comfort evaluation program for a structure constituted by a first, second, . . . n-th part (n is a natural number of at least two) wherein at least one of these parts is a translucent member for introducing light to the inside, the thermal comfort evaluation program comprising program codes for instructing to a computer to realize the steps described in the first aspect.

According to a fourth aspect of the present invention, there is provided a thermal comfort evaluation system for a structure constituted by a first, a second, . . . an n-th part (n is a natural number of at least two) wherein at least one of these parts is a translucent member for introducing light to the inside, the thermal comfort evaluation system for a structure comprising:

means for preparing data of (1) the material property of the first part, the material property of the second part, . . . the material property of the n-th part, and data of (2) an mount of solar radiation passing through the translucent member to reach a measuring device having a shape imitating a human body part, an amount of solar radiation to the structure, an amount of convection heat transfer in the structure, an amount of radiation heat transfer in the structure, humidity in the structure and/or a thermo-regulating function of the measuring device, and calculating at least one of the amount of heat loss from the surface of the measuring device, the temperature of the measuring device and/or the wettedness at the surface of the measuring device based on at least one in each of data (1) and (2), and means for calculating a thermal comfort index of the measuring device by using a result of the above calculation.

According to a fifth aspect of the present invention, there is provided an assisting program for designing a structure constituted by a first, second, . . . n-th part (n is a natural number of at least two) wherein at least one of these parts is a translucent member for introducing light to the inside, the assisting program for designing a structure comprising program codes for instructing to a computer to realize the steps described in the second aspect.

According to a sixth aspect of the present invention, there is provided an assisting system for designing a structure constituted by a first, a second, . . . an n-th part (n is a natural number of at least two) wherein at least one of these parts is a translucent member for introducing light to the inside, the assisting system for designing a structure comprising:

(a) means for preparing at least one candidate value for each of the material property of the first part, the material property of the second part, . . . the material property of the n-th part, and registering candidate values of material properties of these parts in a predetermined data base, (b) means for selecting and reading the material property registered in said data base for each part and preparing at least one combination among the registered material properties, calculating at least one of the amount of heat loss from the surface of the measuring device, the temperature of the measuring device and/or the wettedness at the surface of the measuring device based on at least one in each of data (1) combinations of material properties thus prepared and (2) an mount of solar radiation passing through the translucent member to reach the measuring device in a form of a human body part, an amount of solar radiation to the structure, an amount of convection heat transfer in the structure, an amount of radiation heat transfer in the structure, humidity in the structure and/or a thermo-regulating function of the measuring device, and calculating a thermal comfort index of the measuring device by using a result of the above calculation, and (c) means for selecting a combination of material properties having a value closest to the optimum thermal comfort index.

BRIEF DESCRIPTION OF THE DRAWINGS

A more complete appreciation of the invention and many of the attendant advantages thereof will be readily obtained as the same becomes better understood by reference to the following detailed description when considered in connection with the accompanied drawings, wherein:

FIG. 4(a) is a partly broken perspective view showing the behavior of direct solar radiation in Type I, and FIG. 4(b) is a similar view in Type II;

FIG. 7 is a block diagram showing a thermo-regulation model;

FIG. 14 is a partly broken perspective view showing an analytical space and a surface model of thermal manikin in a case that a vehicle of recreational type accommodates a passenger;

FIG. 15(a) is a partly broken perspective view showing a result of simulation using solar radiation and FIG. 15(b) is a partly broken perspective view showing a result of simulation using a climate control room;

DETAILED DESCRIPTION OF THE PREFERRED EMBODIMENTS

In the following, preferred embodiments of the present invention will be described with reference to drawings.

Figure 1:
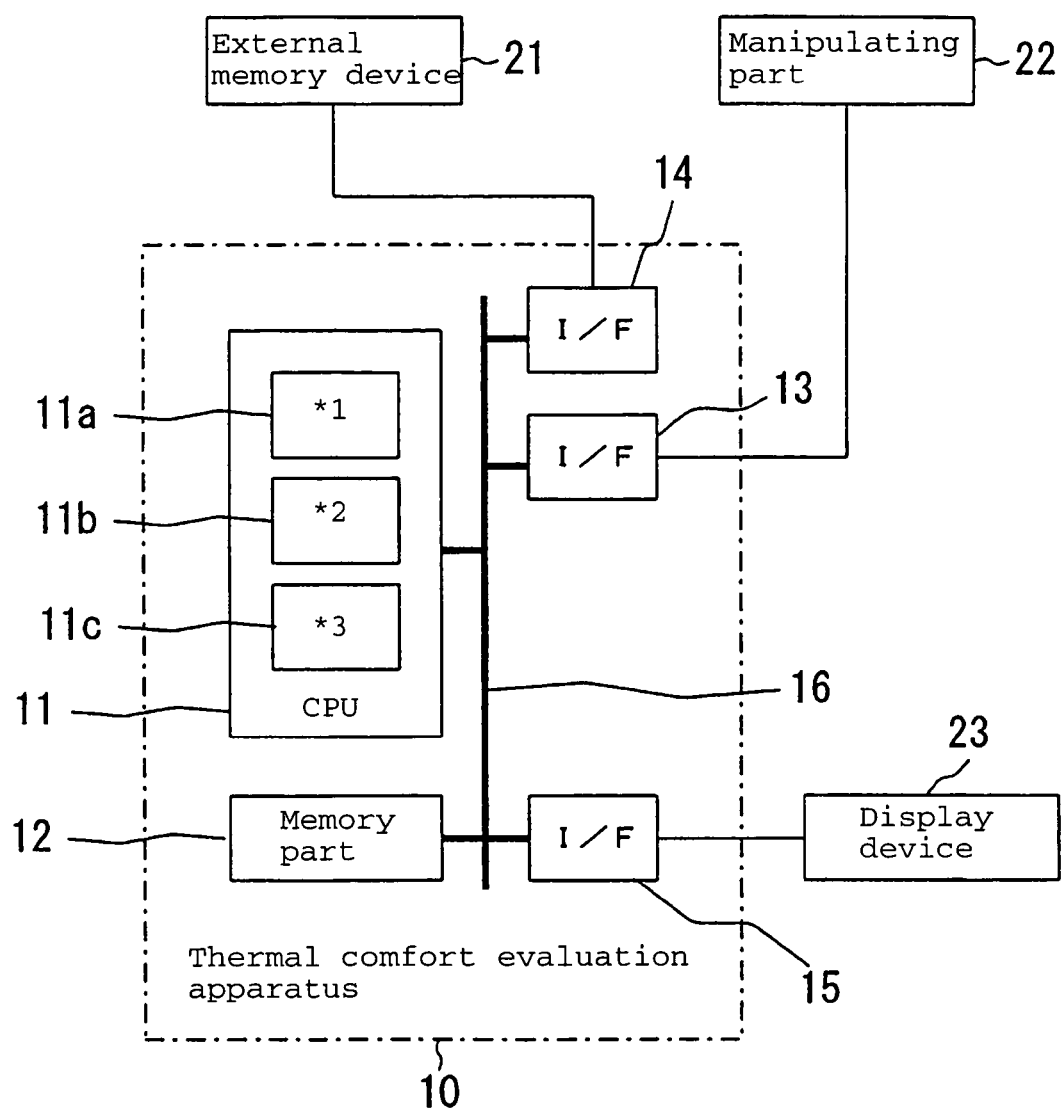
FIG. 1 is a block diagram showing an embodiment of the thermal comfort evaluation apparatus according to the present invention.

FIG. 1 is a block diagram showing an embodiment of the present invention. In FIG. 1, a thermal comfort evaluation apparatus 10 comprises a computer system such as a work station or the like, which is connected to external devices such as HDD (Hard Disk Drive), an external memory unit 21 such as an optical disk device, an electro-optical disk device or the like, a manipulating part 22 such as a key board, a mouse or the like, and a display device 23 such as CRT (Cathode Ray Tube), a liquid crystal display, PDP (Plasma Display Panel) or the like.

The thermal comfort evaluation apparatus 10 comprises a central processing unit 11, a memory part 12 such as RAM (Random Access Memory), or ROM (Read Only Memory) or the like, I/F13, 14 and 15 functioning as input/output interfaces and a bus 16. The bus 16 is connected to each part in the thermal comfort evaluation apparatus 10 so that each part sends or receives an address signal, a data signal and various kinds of control signals through the bus 16.

The central processing unit 11 is a device having an operating function and a controlling function, and it reads out a program for a numerical simulation from the external memory unit 21 to execute operation in the memory part 12 as a working area. Accordingly, the central processing unit 11 is provided with an operation part 11a, an evaluation part 11b and a selection part 11c by means of hardware or software to execute a numerical simulation.

The manipulation part 22 is connected to an I/F13. When a user operates the manipulation part 22, an instruction signal is supplied through the I/F13 to the central processing unit 11. The external memory device 21 which holds a database including various kinds of data such as data of the shape of structures and human bodies, data concerning calculation conditions, data of materials and shapes (which are specified by material properties) usable for each part of a vehicle body (such as main body, seat, instrument panel, rear panel, toe board, center console and so on) and many types of glass, is connected to an I/F14. The reading-out of data from the external memory device 21 and the writing-in of data to the external memory device 21 are carried out under control by the central processing unit 11. I/F15 is connected to the display device 23. In the display device 23, information inputted by the manipulating part 22 or a result simulation is visually displayed.

The thermal comfort evaluation apparatus 10 reads out data of shapes of a structure or a numerical model of human body from the external memory device 21 to perform a simulation of thermal condition in an indoor space or a passenger compartment by using the obtained data. A result of the simulation is stored in the external memory device 21 and a visual image is displayed in the display device 23. Accordingly, a user can evaluate the comfort of a translucent member such as a window glass sheet attached to a structure or a vehicle by observing such image. For instance, the evaluation of thermal environment in a passenger compartment is carried out as follows.

Figure 2:
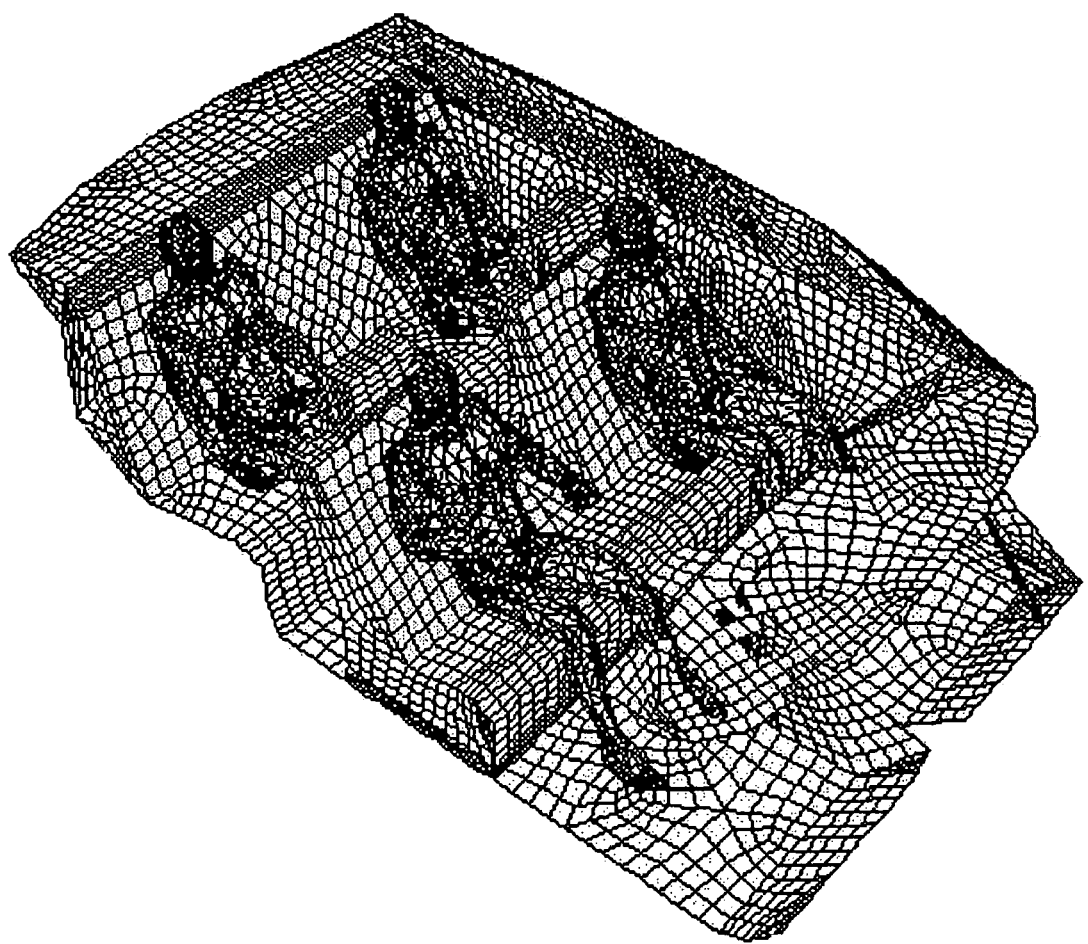
FIG. 2 is a partly broken perspective view showing a numerical model to evaluate the thermal comfort of a window glass sheet.

FIG. 2 is a partly broken perspective view showing an example of evaluating the thermal environment of a passenger compartment. FIG. 2 shows a surface model comprising a plurality of surface elements of a passenger compartment (a sedan-type vehicle of right starring wheel accommodating 5 passengers) and passengers in the compartment. Two separated seats are provided in a front portion of the passenger compartment and a bench type seat capable of accommodating 3 passengers is provided in a rear portion of it. In the surface model, 4 passengers in total are on the front and rear seats and the passenger on the driver's seat holds the starring wheel.

A windshield is provided at a front portion of the compartment, sidelites (a front sidelite and a rear sidelite) are provided at both sides and a rear glass is provided at a rear portion of the compartment. Solar radiation over a window glass sheet attenuates in response to material properties of glass (i.e., the transmittance of solar radiation, the absorptance of solar radiation, the emissivity and the overall heat transfer coefficient) before entering into the passenger compartment. The incident light increases compartment temperature because it heats each part in the passenger compartment.

On the other hand, surfaces of the passengers and each vehicle interior part are divided into a plurality of surface elements, and the indoor space between the passengers and vehicle interior parts is divided into a plurality of cubic elements (not shown). In this embodiment, a quadrangle surface element expressed by a bilinear form and a hexahedra element are used. By using these surface elements and cubic elements, a numerical simulation about the solar radiation to the passenger compartment, radiation in the compartment and temperature and airflow fields in the indoor space is carried out.

In the passenger compartment, it is unavoidable that the solar radiation entering through window glass sheets provides a thermally non-uniform environment. On the assumption that a heating, ventilation and air conditioning system (not shown) is installed in the passenger compartment, positions of an airflow outlet and an airflow inlet, temperature of flowing air, rates of flowing air and sucked air, directions of flowing air and sucked air, the absolute humidity (or relative humidity) of air and so on can be determined optionally. Data relating to this heating, ventilation and air conditioning system are registered in the external memory device 21 in FIG. 1 as well as material properties of the parts.

Other than the heating, ventilation and air conditioning system, a radiation cooling/heating panel system, a ventilation or a humidity control system may be provided optionally. Calculation conditions used in this simulation are shown in Table 1. Further, since the position of the sun can theoretically calculated from the present location of the vehicle and date and hour on which the simulation is carried out, it is possible to determine an irradiation angle of solar radiation entering into the passenger compartment through the window glass sheets.

TABLE 1

Calculation conditions

| | |
|---|---|
| Present location: | Tokyo |
| Date and hour: | 12:00, August 1 |
| Outdoor temperature: | 35° C. |
| Human body: | (metabolic rate: 1 met, clothing amount: 0.6 clo, relative humidity: 50%, absorptance of solar radiation: 0.74) |
| Temperature of flowing air at a front seat: | 10° C. |

Running forward the south at 40 km/h

Figure 3A:
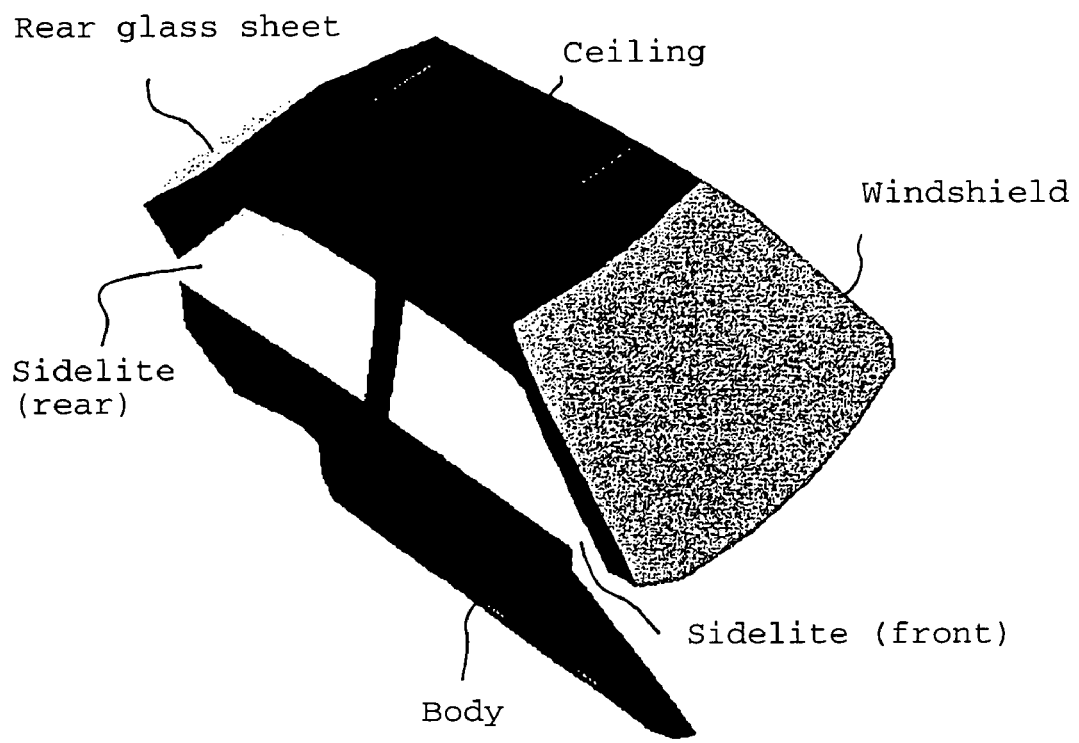
FIG. 3(a) is a partly broken perspective view showing each part constituting a vehicle body (viewed from a front side) and FIG. 3(b) is a partly broken perspective view showing each part constituting a vehicle body (viewed from a back side)
Figure 3B:
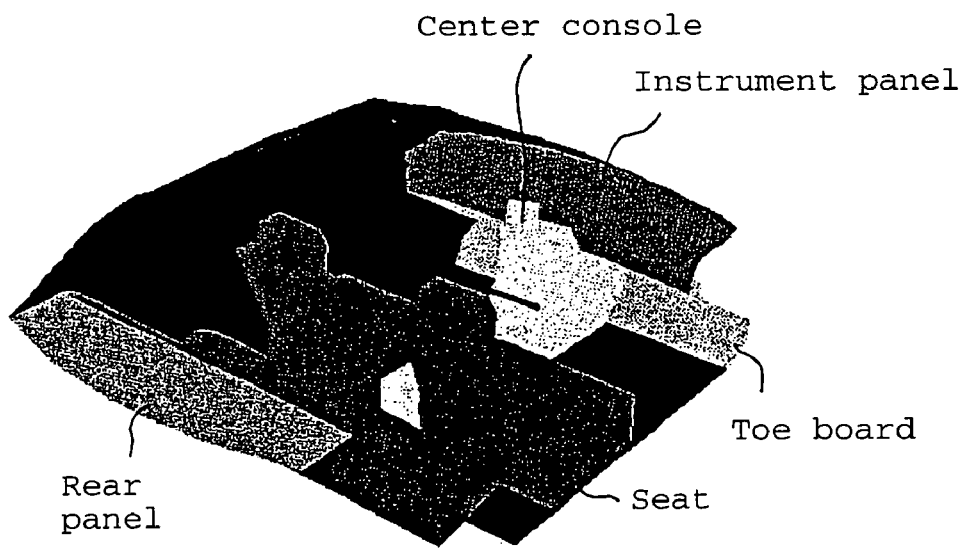

FIG. 3 is a partly broken perspective view showing each part constituting a vehicle body. FIG. 3(a) is such view from a viewpoint looking down the windshield from a front side of the vehicle, and there are provided the windshield and sidelites (front and rear) in the vehicle body. A ceiling is provided from an upper edge of the windshield to a rear portion of the vehicle, and a rear glass sheet is disposed in the rear portion of the vehicle. FIG. 3(b) is a view looking the passenger compartment from a rear portion of the vehicle, and parts such as front and rear seats, a rear panel, a toe board, an instrument panel, a front panel, a center consol and so on are provided on the shasses (not shown).

FIG. 4 is a diagram showing a distribution of direct solar radiation incident into a passenger compartment in a case that two types (Type I and Type II) shown in Table 2) are used. FIG. 4(a) shows the case that glass of Type I is used, and FIG. 4(b) shows the case that glass of Type II is used. The intensity in a distribution of solar radiation is expressed by gradation of white and black in FIG. 4 (namely, the solar radiation receiving quantity is larger as a white tone increases, and the solar radiation receiving quantity is smaller as a black tone increases). As understood from the observation to the passenger on the driver seat, the amount of direct solar radiation reaching the passenger compartment is smaller in Type II and therefore, Type II is excellent in insulation performance.

TABLE 2

| Type of glass | | Transmittance of solar radiation (%) | Absorptance of solar radiation (%) |
|---|---|---|---|
| (a) Type I | | | |
| Windshield | Glass A | 52.7 | 41.7 |
| Sidelite (front) | Glass B | 60.0 | 34.0 |
| Sidelite (rear) | Glass B | 60.0 | 34.0 |
| Rear glass | Glass B | 60.0 | 34.0 |
| (b) Type II | | | |
| Windshield | Glass C | 45.3 | 28.7 |
| Sidelite (front) | Glass D | 48.4 | 46.1 |
| Sidelite (rear) | Glass E | 18.4 | 77.1 |
| Rear glass | Glass E | 18.4 | 77.1 |

Further, the passenger compartment is constituted by n (n is a natural number of at least two) number of parts including at least a translucent member, and the material property of the material used for each part is stored in the external memory device 21 in FIG. 1 as well as properties of two types of glass in Table 2. The material property usable for each part can be shown in a matrix form as shown in Table 3(a). For example, with respect to a part P, any one of material properties $M_{00}$, $M_{10}$, $M_{20}$, $M_{30}$, $M_{40}$ and $M_{50}$ can be selected.

Namely, at least one material property M (=$M_{00}$, $M_{01}$, ..., $M_{10}$, ...) is registered for each part, and each material property correspond to a candidate value of a material for an actually used part. When an instrument panel is taken as an example, material properties of plastic materials are chosen and when a seat is taken as an example, material properties of fabrics or leather are chosen. Further, the material property M includes at least one selected from the group consisting of transmittance of solar radiation, absorptance of solar radiation, emissivity, overall heat transfer coefficient and data (CAD data) of each part.

Accordingly, it is necessary to prepare at least one combination of material properties M of parts constituting the passenger compartment after the material property M is selected for each part (Table 3 (b)). Then, a thermal comfort index that a human feels (SET*, equivalent temperature or TSV or the like, which will be described later) is calculated for each combination. By comparing thermal comfort indices obtained by calculation, it is possible to obtain a combination of material properties which can provide the optimum thermal comfort as shown in Table 3 (c). Here, a value closest to "0" is an optimum value.

In this case, when the thermal comfort index is calculated in consideration of not only the material property but also data relating to a heating, ventilation and air conditioning system or the like, it is possible to design an optimum structure with such heating, ventilation and air conditioning system. In this case also, data relating to the air-conditioning system are read out from the external memory device 21 in FIG. 1 as well as the data of material properties, and the thermal comfort index is calculated by adding the read-out date. Further, when data concerning various shapes of each part are prepared as in Table 3, it is possible to select a combination of shapes of parts, which provides an optimum thermal comfort.

TABLE 3 (a)

Material property usable for each part

| | Part P | Part Q | Part R | Part S |
|---|---|---|---|---|
| Material property | $M_{00}$ | $M_{01}$ | $M_{02}$ | $M_{03}$ |
| | $M_{10}$ | $M_{11}$ | $M_{12}$ | $M_{13}$ |
| | $M_{20}$ | $M_{21}$ | $M_{22}$ | $M_{23}$ |
| | $M_{30}$ | $M_{31}$ | $M_{32}$ | $M_{33}$ |
| | $M_{40}$ | $M_{41}$ | $M_{42}$ | $M_{43}$ |
| | $M_{50}$ | $M_{51}$ | $M_{52}$ | $M_{53}$ |

M** Transmittance of solar radiation, absorptance of solar radiation, emissivity, overall heat transfer coefficient etc.

TABLE 3 (b)

Example of combination of material properties

| Part P | Part Q | Part R | Part S | TSV |
|---|---|---|---|---|
| $M_{10}$ | $M_{21}$ | $M_{12}$ | $M_{23}$ | 2 (warm) |
| $M_{10}$ | $M_{31}$ | $M_{32}$ | $M_{33}$ | 3 (hot) |
| . | . | . | . | . |
| $M_{30}$ | $M_{31}$ | $M_{52}$ | $M_{43}$ | 0 (neutral) |
| . | . | . | . | . |

TABLE 3 (c)

Example of combination capable of obtaining the optimum thermal comfort index

| Part P | Part Q | Part R | Part S |
|---|---|---|---|
| $M_{10}$ | $M_{31}$ | $M_{52}$ | $M_{43}$ |

Next, description will be made as to a thermal model of human body in consideration of solar radiation, proposed by the present invention.

Figure 5:
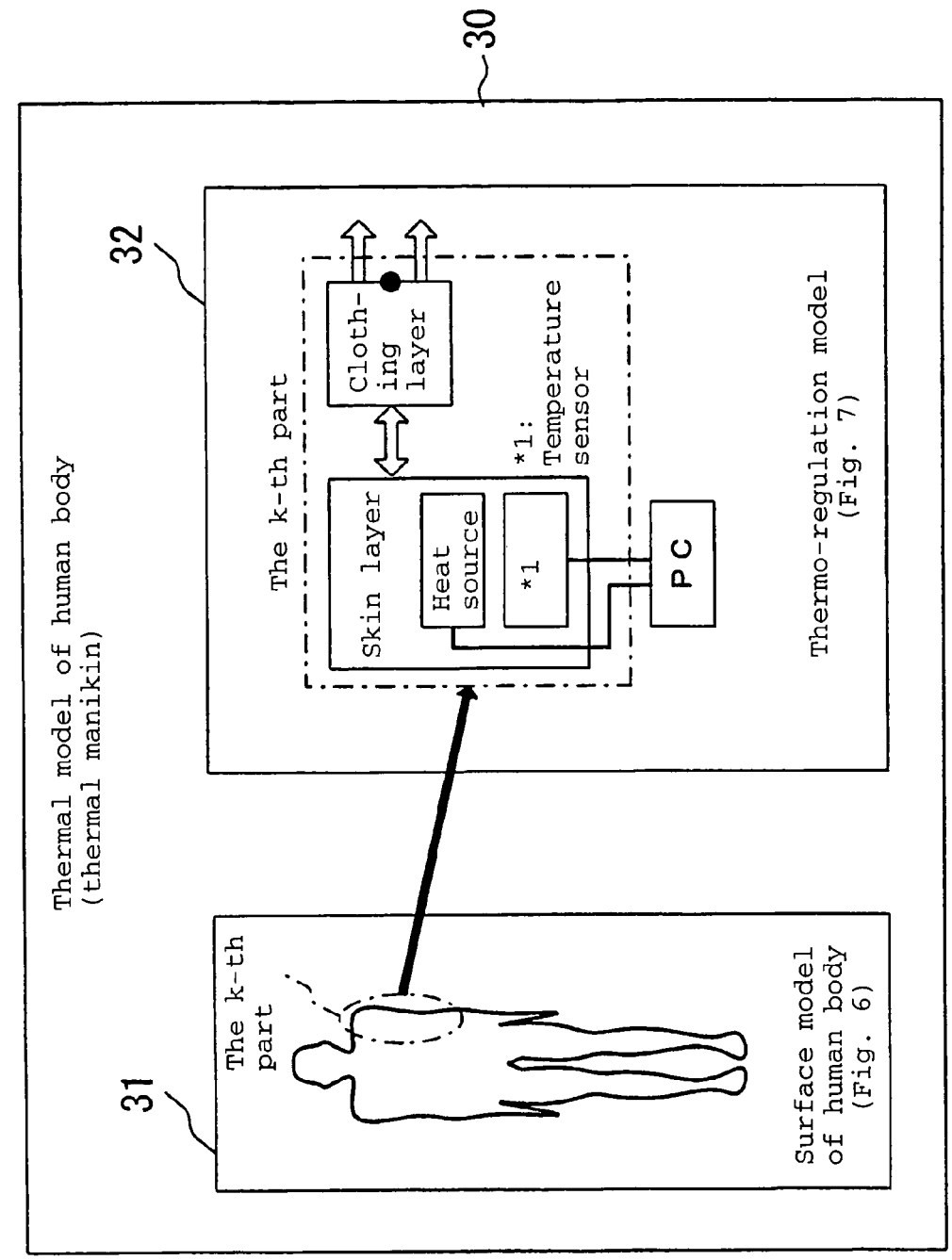
FIG. 5 is a diagram showing a thermal model of human body shape.

FIG. 5 is a diagram showing a thermal model of human body. A manikin for evaluating thermal environment prepared based on the thermal model is a so-called thermal manikin. The thermal manikin used in the present invention is called a numerical thermal manikin which can reproduce thermal sensation of human body by only computer simulation.

There have been proposed several thermo-regulation models of human body. As representative examples of these proposals, there are a two-node model by A. P. Gagge, A. P. Fobelets' and L. G. Berglund (see a Standard Predictive Index of Human Response to the Thermal Environment, ASHRAE Transactions, Vol. 92, pp. 709–731, 1986.) and a 65 multi-nodes model by S. Tanabe, et al (see EVALUATION OF THERMAL COMFORT USING COMBINED MULTI-NODE THERMOREGULATION (65MN) AND RADIATION MODELS AND COMPUTATIONAL FLUID DYNAMICS (CFD), Energy & Buildings-Special Issue, 2002. 4).

However, the above-mentioned proposals do not take the shape of human body sufficiently into consideration. For example, in the two-nodes model, a model of human body is formed by a core layer and a shell layer covering the core layer. Accordingly, simulation is impossible with respect to solar radiation to a part such as the head, a hand or a foot. The 65 multi-nodes model has a more precise structure of human body than the two-nodes model, namely, it has 16 parts such as the head, chest, legs and so on and the surface area and the weight of each part are specified. However, consideration is not taken sufficiently with respect to the shape of each part. Since the shape of each part is unclear even in the 65 multi-nodes model, the angle factor between each part and a wall or a window can not be calculated, and therefore, it is difficult to obtain correctly the distribution of solar radiation to the human body.

On the other hand, there have been proposed several simulation systems in consideration of the shape of human body. However, a sufficient study has not been made on environmental conditions around a human body (solar radiation, heat radiation or the like) in order to simulate thermal sensation of human body correctly (see G. Fronzes, et al.: Athebes, a car thermal behavior simulation software, ATA-Ingegneria Automotoristica, Marzo, Vol. 49, No. 3, 1996.).

Accordingly, it is difficult to simulate correctly thermal sensation in conditions that the passenger compartment is influenced largely by solar radiation.

According to the present invention, the above-mentioned problem can be eliminated by combining a model having a shape imitating the shape of a human body (hereinbelow, referred to as a surface model of human body or simply, a surface model) and a model having a human thermo-regulation function (hereinbelow, referred to as a thermo-regulation model), whereby the thermo-regulating function of a human body can correctly be simulated even in an environment that influence by solar radiation is large.

Figure 6A:
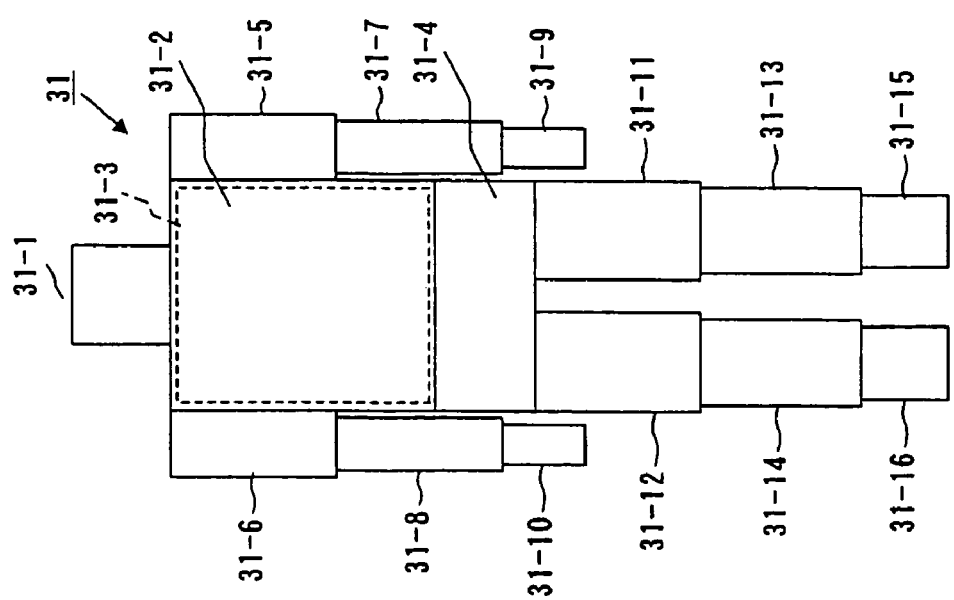
FIG. 6(a) is a front view showing classification of each part of a surface model of human body.
Figure 6B:
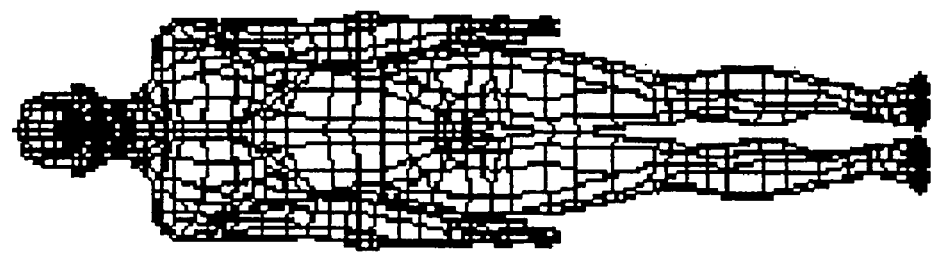
FIG. 6(b) is a front view showing the detail (the arrangement of surface elements) of the surface model of human body.
Figure 6C:
FIG. 6(c) is a side view showing the detail (the arrangement of surface elements) of the surface model of human body.

From the above-mentioned viewpoint, a thermal model of human body (a thermal manikin) 30 shown in FIG. 5 is formed by the combination of a surface model 31 and a thermo-regulation model 32. FIGS. 6 and 7 show particulars of the structure. FIG. 6(a) is a front view showing roughly classified parts of the surface model shown in FIG. 5, and FIGS. 6(b) and 6(c) are respectively a front view and a side view showing the detail (surface elements) of the surface model.

The model shown in FIG. 6(a) is classified into 16 parts in total: head 31-1, chest 31-2, back 31-3, pelvis 31-4, l-shoulder 31-5, r-shoulder 31-6, l-arm 31-7, r-arm 31-8, l-hand 31-9, r-hand 31-10, l-thigh 31-11, r-thigh 31-12, l-leg 31-13, r-leg 31-14, l-foot 31-15, and r-foot 31-16. However, human parts is not necessary to be classify into 16 parts but may be changed optionally.

In order to simplify simulation of thermo-regulating function of each part, it can be also assumed that each part has a skin layer installing therein a heat source (a clothing layer is provided depending on a part), and the thermo-regulation model shown in FIG. 7 is provided for each part. The surface area and the weight of each part are shown in Table 4.

TABLE 4

Parts of 65 multi-nodes model

| Body part | Surface area of body part ($m^2$) | Weight of body part (kg) |
| --- | --- | --- |
| 1. Head | 0.140 | 4.020 |
| 2. Chest | 0.175 | 12.400 |
| 3. Back | 0.161 | 11.030 |
| 4. Pelvis | 0.221 | 17.570 |
| 5. L-shoulder | 0.096 | 2.163 |
| 6. R-shoulder | 0.096 | 2.163 |
| 7. L-arm | 0.063 | 1.373 |
| 8. R-arm | 0.063 | 1.373 |
| 9. L-hand | 0.050 | 0.335 |
| 10. R-hand | 0.050 | 0.335 |
| 11. L-thigh | 0.209 | 7.013 |
| 12. R-thigh | 0.209 | 7.013 |
| 13. L-leg | 0.112 | 3.343 |
| 14. R-leg | 0.112 | 3.343 |
| 15. L-foot | 0.056 | 0.480 |
| 16. R-foot | 0.056 | 0.480 |
| The whole body | 1.870 | 74.430 |

As shown in FIGS. 6(b) and 6(c), the surface of each part is divided into a plurality of surface elements, and calculation of an amount of solar radiation reaching the human body, an amount of heat loss radiated from the human body surface, skin temperature and so on is carried out for each surface element.

Next, description will be made as to a thermo-regulation model assembled in each part of a human figure.

FIG. 7 is a block diagram showing the thermo-regulation model assembled in each part. A thermo-regulation model 32 comprises 16 parts (the k-th part 34 comprises a skin layer 34d including therein a heat source 34d-1 and a temperature sensor 34d-2 and a clothing layer 34e). A heat quantity generated from the heat source 34d-1 is controlled by a personal computer 34d-3. A heat transport between the skin layer and the clothing layer is effected as follows. In the skin layer 34d, the heat quantity from the heat source 34d-1 is controlled based on temperature measured by the temperature sensor 34d-2 so that the skin temperature is controlled. There is a heat transport due to thermal conduction between the clothing layer 34e and the skin layer 34d. There is a case that an air layer exists between the clothing layer and the skin layer. Accordingly, in conducting a simulation, it is necessary to consider a heat transport due to any one among convection, radiation and humidity. The heat generation means may be disposed in a layer other than the skin layer (e.g., inside the human figure).

Since the clothing layer 34e is exposed to an external environment 40, there is a heat transport due to convection and radiation. On the assumption that there is a heat source 41 such as the sun or the like (or, a lamp may be disposed artificially) in the external environment 40, the clothing layer 34e is warmed by radiation from the heat source 41 (or light beams irradiated by the lamp). The presence or absence of the clothing layer 34e can be determined for each surface element. In this embodiment, calculation is conducted under conditions that the skin layer is exposed at the head 31-1, the l-hand 31-9 and the r-hand 31-10, and therefore they have no clothing layer. Further, the wavelength of light beams irradiated from the heat source 41 can be optionally determined by the manipulating part 22, and set values are stored in the external memory device 21 in FIG. 1.

Next, description will be made as to a sequence of evaluating the thermal comfort of a passenger caused by a window glass by a numerical simulation, and selecting the optimum type of glass as a window glass based on a result of the evaluation, and selecting a combination of parts capable of providing the optimum thermal environment.

Figure 8:
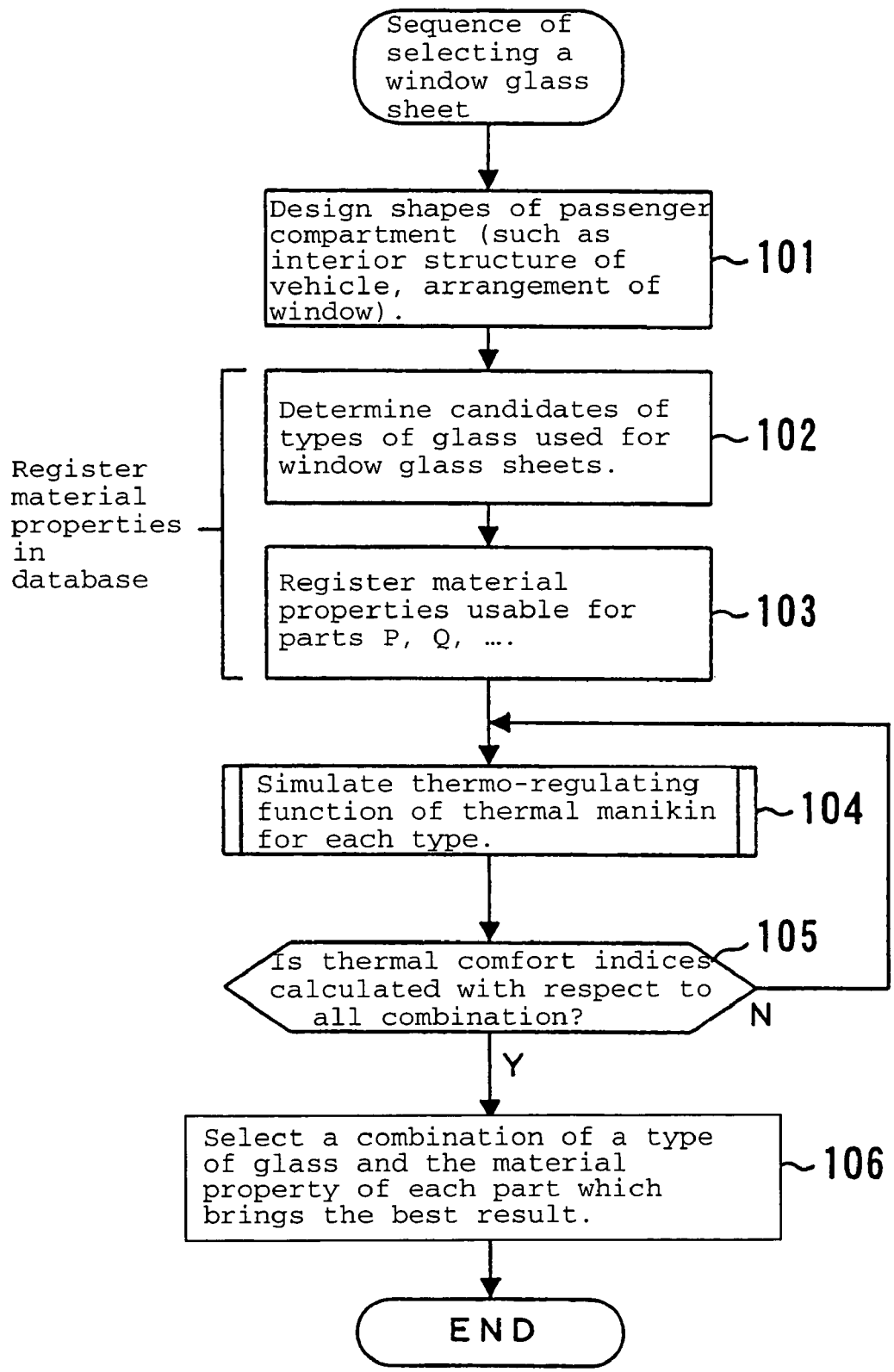
FIG. 8 is a flow chart showing a sequence of selection (main routine) of a window glass sheet and each part.

FIG. 8 is a flow chart showing a sequence of selecting material properties of glass and each part. First, CAD (Computer Aid Design) data indicating a previously prepared vehicle body shape, a plurality of surface elements constituting an inner surface of the passenger compartment, CAD data indicating a human body figure, a plurality of surface elements indicating shapes of the human body surface, a plurality of cubic elements obtained by dividing the indoor space between parts constituting the passenger compartment and human body figure, and candidate values of some types of glass usable for window glass sheets (in this embodiment, Types I and II shown in Table 2) are stored in the external memory device 21 in FIG. 1 (Steps 101 and 102). Further, the material property of each part as shown in Table 3 is stored in the external memory device 21 (Step 103).

Then, the operation part 11a and the evaluation part 11b read out data of types of glass and their material properties stored in the external memory device 21 to prepare possible combinations of these data, and calculation of solar radiation passing through window glass sheets, calculation of the thermo-regulation model of human body figure and calculation of heat transport in the passenger compartment (i.e. calculations of convection, radiation, humidity and so on) are conducted in a combined manner to thereby perform a numerical simulation of thermal sensation that a human is expected to feel (Step 104). Alternatively, a simulation may be carried out by changing material properties in response to angle factors shown in FIG. 14 as described later.

Then, determination is made as to whether or not thermal comfort indices (equivalent temperature, a predicted mean vote (PMV) or a thermal sensation vote (TSV)) are calculated with respect to all combinations every time the simulation is completed (Step 105). If not, the operation is returned to Step 104. After the calculation has been made with respect to all combinations of types of glass and material properties of parts, the selection part 11c in FIG. 1 compares each result of simulation, and selects a combination of a type of glass and the material property of each part which brings the best result (Step 106). As a result, the combination of material properties as shown in Table 3(c) can be selected for example. When it is enough to evaluate only the thermal comfort of a vehicle body (structure), it is sufficient to conduct operations from the beginning to Step 105.

There are some options in selecting the combination which brings the best result. There can be considered to select "neutral" in terms of TSV, which will be described thereafter, in an intermediate season, to select "slightly cool" in summer and to select "slightly warm" in winter. However, the determination of these options depends on a performer of the simulation. As a possible method, there is considered a method that the optimum value is previously determined, and a value closest to the optimum value is selected.

Further, in selecting glass having excellent thermal performance and excellent translucent performance, several kinds of glass having excellent thermal comfort index are selected, and then, glass having the best visible light permeability should be selected. Combinations of several types of glass usable for window glass sheets are not limited to those shown in Table 2 but it is possible to determine combinations optionally.

Description will be made in detail with reference to FIGS. 9 to 13 concerning a numerical simulation of thermal sensation.

Figure 9:
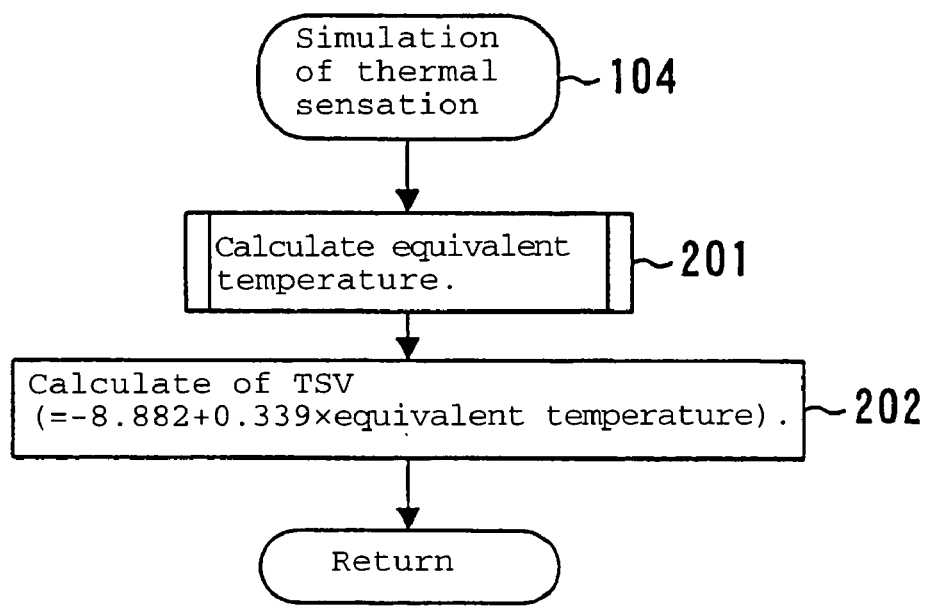
FIG. 9 is a flow chart showing the detail of Step 104.

FIG. 9 is a flow chart showing particulars of Step 104. In this embodiment, first, an equivalent temperature as an index indicating thermal sensation is calculated (Step 201), and TVS is calculated by using the equivalent temperature (Step 202). TSV is an index corresponding to the thermal sensation that a human actually feels, which is calculated according to a conversion formula in Table 5 in this embodiment.

There is a difference in thermal sensation depending on seasons and areas. Table 5 shows regression equations in Japan (summer season), Japan (autumn season), U.S.A., Denmark and Singapore. Table 6 shows correspondence between thermal sensation votes (TSV) and thermal sensations that a human feels. Table 6 shows 7 ranks wherein "0" means "neutral", "1" slightly warm, "2" warm, "3" hot, "–1" slightly cool, "–2" cool and "–3" cold. Temperature that thermal sensation vote of human is neutral (neutral temperature) is described adjacent to regression equations.

TABLE 5

| | Regression equation | Neutral temperature (° C.) |
|---|---|---|
| Japan (summer season) | TSV = –8.882 + 0.339 · SET* | 26.2 |
| Japan (autumn season) | TSV = –6.883 + 0.271 · SET* | 25.4 |
| U.S.A. | TSV = –8.010 + 0.290 · SET* | 25.8 |
| Denmark | TSV = –7.420 + 0.310 · SET* | 25.6 |
| Singapore | TSV = –9.388 + 0.367 · SET* | 25.6 |

TABLE 6

| -3 | -2 | -1 | 0 | 1 | 2 | 3 |
|---|---|---|---|---|---|---|
| Cold | Cool | Slightly cool | Neutral | Slightly warm | Warm | hot |

Figure 10:
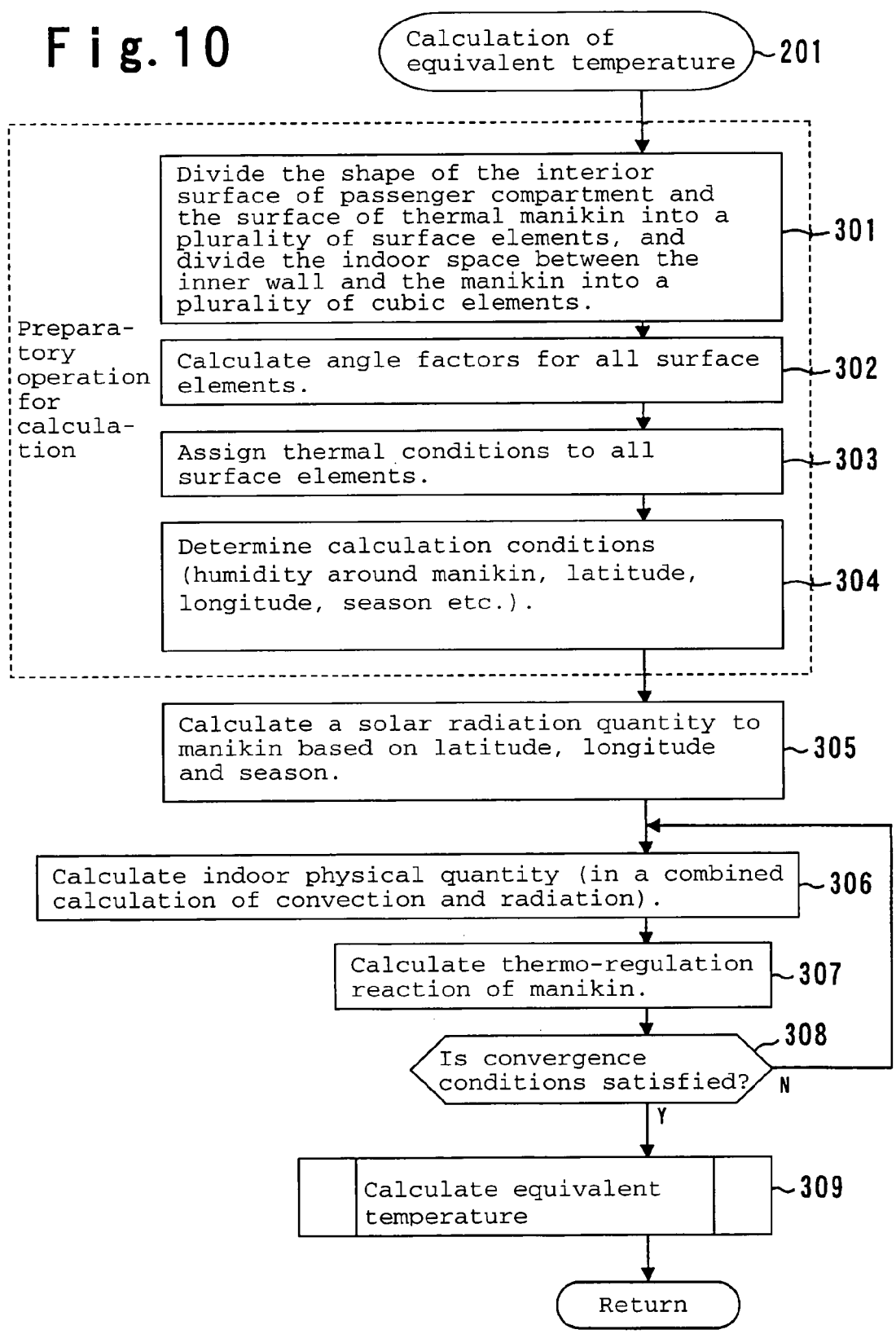
FIG. 10 is a flow chart showing the detail of Step 201.
Figure 11:
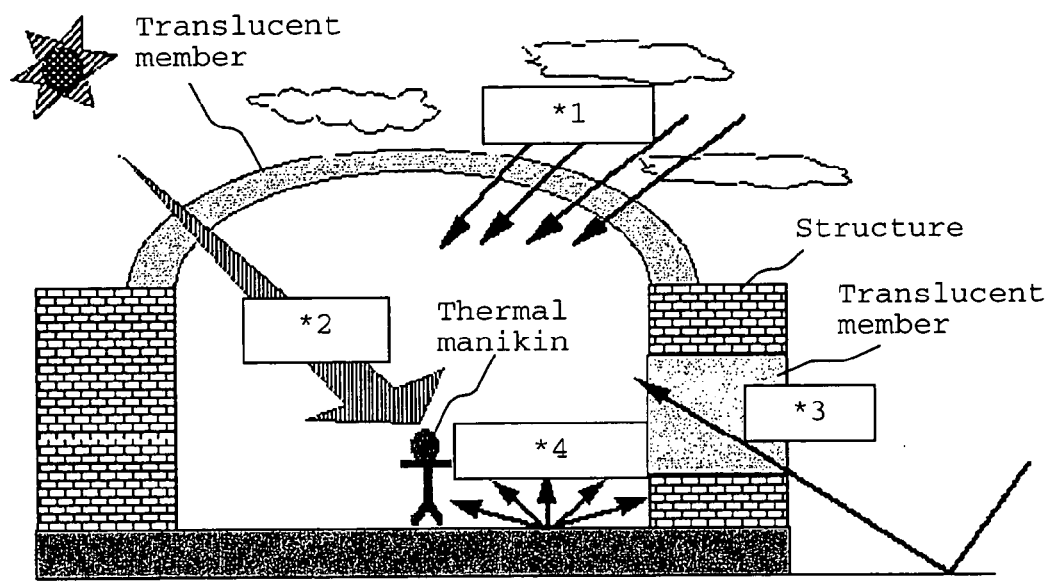
FIG. 11 is a diagram showing various kinds of solar radiation.

FIG. 10 is a flow chart showing particulars of Step 201. First, as a preparatory operation of calculation, operations from Step 301 to Step 304 are carried out. Then, the inner surface of the passenger compartment and the shape of surface of thermal manikin are divided into a plurality of surface elements and the indoor space between the inner surface of the passenger compartment and the thermal manikin are divided into a plurality of cubic elements (Step 301). Then, calculation of angle factor is made with respect to all surface elements of the thermal manikin and the inner surface of the passenger compartment (Step 302). The angle factor is a parameter of non-dimensional number which can determine radiation exchange between surface elements.

Then, thermal conditions such as the overall heat transfer coefficient, the emissivity, the absorptance of solar radiation, the transmittance of solar radiation and so on are assigned to each surface element (Step 303). Calculation conditions, shown in Table 1, such as an amount of thermal insulation of clothes of thermal manikin, a present location of the vehicle (i.e., a latitude and a longitude) and date and hour and so on are determined (Step 304). These calculation conditions are inputted by means of the manipulating part 22 in FIG. 1, and inputted data are stored in the external memory device 21.

Then, an azimuth and an altitude at the position of the vehicle are calculated based on the said latitude and a longitude and the season in the operation part 11*a* so that the irradiation angle of solar radiation received by the vehicle is calculated. Then, various kinds of solar radiation quantity reaching directly a human body (any one of quantities of direct solar radiation, sky-diffused solar radiation, solar radiation reflected on the ground and internal reflection of the solar radiation or an optional combination of these) are calculated based on the irradiation angle and properties of window glass sheets (Table 2) (Step 305). Then, the amount of absorptance of solar radiation is calculated based on the above-mentioned result of calculation and the absorptance of clothing surface or skin surface.

As described in the document 1, solar radiation includes light beams of a wavelength of 0.3–2.5 μm. Accordingly, it is necessary to consider the wavelength in calculating the solar radiation quantity. For example, calculation may be conducted over the entire wavelength region of 0.3–2.5 μm or calculation may be conducted for each wavelength by selecting optionally some kinds of wavelengths. Then, calculation of heat transfer in the structure and calculation of the thermo-regulation reaction are conducted in combination (Steps 306–308) and the equivalent temperature at the skin surface of the thermal manikin is calculated (Step 309).

Description will be made as to particulars of calculation of solar radiation. An indoor space defined by a wall member containing a translucent member undergoes largely influence of transmitting solar radiation. Accordingly, accuracy in the prediction of thermal comfort depends largely on how a distribution of solar radiation gain from a heat source can be predicted correctly. It is unnecessary to conduct the calculation of solar radiation together with calculation of temperature and airflow but it can be conducted independently. For example, after calculations of an amount of direct solar radiation reaching a surface of thermal manikin and a surface of the inner wall of the indoor space, an amount of sky-diffusion solar radiation, an amount of solar radiation reflected on the ground and an amount of relative reflection of solar radiation inside the reached solar radiation, the amount of solar radiation gain at the surface of the thermal manikin and the surface of the inner walls is calculated (FIG. 11) on the basis of each solar radiation mentioned above. Then, temperature and airflow are calculated on the basis of the amount of solar radiation gain at the surface of the thermal manikin and the surface of the inner wall. Further, the temperature inside the thermal manikins may be calculated.

The sequence of calculations is as follows. First, the position of the sun is calculated by inputting the present location of the building and date and hour at the present time. Then, an amount of direct solar radiation $I_{dn}$ to the normal plane and an amount of sky-diffusion solar radiation $I_{sky}$ to the horizontal plane are estimated by an empirical equation based on the obtained data of measurements. Then, various amounts of reached solar radiation are calculated based on the thus obtained amount of direct solar radiation to the normal plane and the amount of sky-diffusion solar radiation to the horizontal plane by taking the thermal performance of the wall such as the transmittance of solar radiation $t_i$ of a translucent member, the reflectivity $\rho_i$ and so on, and geometrical shapes of parts in the indoor space and a solar radiation shading member such as a hood, into consideration.

A method for calculating an amount of solar radiation reaching the surface of a thermal manikin is as follows.

1) Calculation of an Amount of Direct Solar Radiation

An amount of direct solar radiation $I_{di}$ reaching a surface element i of a surface model of human body shape is calculated according to formula (1) by inputting an amount of direct solar radiation $I_{dn}$ to the normal plane and a transmittance $t_j$ of solar radiation of each of wall members (translucent members) through which solar radiation passes.

$$I_{di} = \begin{cases} I_{dn} \prod_{j=1}^{m} t_j \cos\theta_i : & \begin{array}{l}\text{a case that the sun can be seen} \\ \text{through an m-number of wall members} \\ \text{through which solar radiation passes}\end{array} \\ 0: \text{Other cases} \end{cases} \quad \text{Formula (1)}$$

Figure 12:
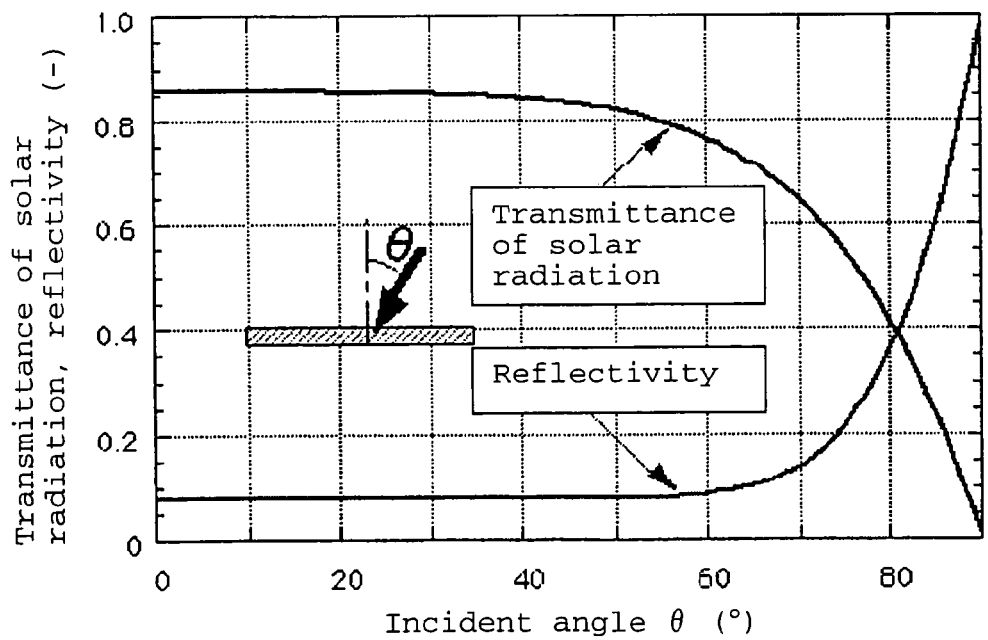
FIG. 12 is a graph showing the relation between an incident angle and transmittance as well as reflectivity.

The transmittance of solar radiation and the reflectivity of a translucent member have incident angle characteristics as shown in FIG. 12. Namely, when the incident angle to the translucent member becomes large, a reflection component will increase and the transmittance of solar radiation of the translucent member will decrease. There causes error in the amount of the solar radiation heat unless the incident angle characteristics are not considered.

2) Calculation of an Amount of Sky-Diffused Solar Radiation

An amount of sky-diffusion solar radiation $I_{si}$ reaching a surface element i of a surface model of human body shape is calculated by an amount of sky-diffused solar radiation $I_{sky}$ to the horizontal plane and an angle factor of a wall surface (translucent member) through which solar radiation passes according to formula (2).

$$I_{si} = (\sum_{j} F_{ij} t_j \beta_{ij} \cdot 0.91) I_{sky} \quad \text{Formula (2)}$$

where $F_{ij}$ is a angle factor between surface elements i and j and $\beta_{ij}$ is a flag determining whether or not the reached solar radiation is sky-diffused solar radiation. A numerical value of 0.91 is a coefficient based on the incident angle characteristics of the transmittance of solar radiation of a translucent member (a glass sheet) with respect to sky-diffused solar radiation.

3) Calculation of an Amount of Solar Radiation Reflected on the Ground

An amount of solar radiation reflected on the ground undergoes influence of the shape, the reflectivity, the direction characteristics of the ground, and accordingly, it is difficult to obtain a correct calculation value. In this embodiment, in the same manner as the method for calculating the amount of sky-diffused solar radiation, an amount of solar radiation $I_{gi}$ reflected on the ground to reach each surface element of the surface model of human body shape is calculated by using an amount of total sky-diffused solar radiation $I_{hol}$ to the horizontal plane and the albedo (the reflectivity of solar radiation energy) $\rho_g$ of the ground according to formula (3).

$$\begin{cases} I_{gi} = (\sum_j F_{ij} t_j \gamma_{ij} \cdot 0.91) \rho_g I_{hol} \\ I_{hol} = I_{dn} \sinh + I_{sky} \end{cases} \quad \text{Formula (3)}$$

where $\gamma_{ij}$ is a flag for determining whether or not the reached solar radiation is a light reflected on the ground, and h is a solar altitude.

4) Calculation of an Amount of Relative Reflection

When solar radiation reaches a surface element of the surface model of human body shape, relative reflection is generated in response to the reflectivity of the surface of the surface model. The reflection includes a diffused reflection, a specular reflection and a complex reflection comprising both types of reflections. In this embodiment, a completely diffused reflection is assumed in order to simplify calculation. Under this condition, an amount of relative reflection can be calculated by a radiosity method using an angle factor between surface elements according to the formula (4).

$$\begin{cases} I_{ri} = I_{di} + I_{si} + I_{gi} + \sum_j F_{ij} G_j \\ G_j = \rho_j \cdot I_{rj} \end{cases} \quad \text{Formula (4)}$$

5) Method for Calculating an Amount of Absorptance of Solar Radiation at the Surface of a Thermal Manikin An amount of direct solar radiation, an amount of sky-diffused solar radiation, an amount of solar radiation reflected on the ground and an amount of relative diffused reflection calculated for each surface element of the surface model are all converted to an amount of absorptance of solar radiation on the surface of the surface model. The method of conversion to the amount of absorptance of solar radiation at the surface of the surface model is made by multiplying the above-mentioned amounts of solar radiation by an absorptance of solar radiation $a_i$ of a surface element i of the surface model according to formula (5).

$$I_i = a_i(I_{di} + I_{si} + I_{gi} + I_{ri}) \quad \text{Formula (5)}$$

By treating this as an amount of absorptance of solar radiation (an amount of heat generated at the surface of a thermal manikin) in the equation of heat balance at a wall surface as shown in Table 7, it becomes possible to conduct a combined analysis of temperature and airflow. At the completion of the combined analysis of temperature and airflow, it is balanced with an amount of heat generated at the surface of the thermal manikin, an amount of thermal conduction by convection in response to an ambient air temperature of the thermal manikin, an amount of thermal conduction by radiation in response to the emissivity of the surface of the thermal manikin and an amount of total thermal conduction in clothes.

Then, indoor physical quantities such as temperature, velocity and turbulence in the indoor space between the thermal manikin and the wall are calculated by utilizing a technique of CFD (Computational Fluid Dynamics) (Step 306). Namely, various boundary conditions at surfaces of the thermal manikin and walls are determined, and a numerical simulation of the convection (including natural convection and forced convection) in the indoor space area is conducted for each of the cubic elements to obtain the velocity, pressure, temperature, humidity and so on.

Boundary conditions in terms of heat are previously stored in the external memory device 21 shown in FIG. 1. The external memory device 21 stores also thermophysical properties of solar radiation (the absorptance of solar radiation and the transmittance of solar radiation) at surfaces of interior part and exterior part, thermophysical properties on heat radiation (such as the emissivity) at surfaces of interior parts, a heat conductance between parts, the reference temperature at the exterior side and the convective heat transfer coefficient at the interior-side wall surface.

As a concrete technique of CFD, a numerical analysis of a Navier-Stokes equation is made by using, for example, a finite element method, a finite volume method or a finite differential method. In particular, in this embodiment, a standard k-ε model in a non-isothermal field is used. Then, the thermo-regulation reaction of the thermal manikin is calculated by utilizing the thermo-regulation model shown in FIG. 7 (Step 307). Then, calculating operations (Steps 306 and 307) are repeated until the skin temperature (or the internal temperature) of each surface element of the surface model of human shape is converged to a predetermined value (Step 308). Then, the equivalent temperature is calculated at Step 309.

The combined calculating operations of CFD, the radiation and the thermo-regulation model can be obtained by solving the equation of heat balance as shown in Table 7. Namely, a solution of the equation of heat balance comprising an amount of convective heat transfer at the wall surface of the passenger compartment, an amount of radiative heat transfer, an amount of absorptance of solar radiation and an amount of heat transfer at the exterior side is obtained, and calculations of 1) connection from the convection field to the radiation field, 2) convergence of the thermo-regulation model and 3) connection from the radiation field to the convection field on the surface of clothing are conducted. In the calculation of 1), the temperature $T_i$ at the surface of clothing and an amount of radiative heat transfer $Q_{ri(net)}$ are obtained; in the calculation of 2), the calculation of the thermo-regulation model is conducted to obtain the temperature $T_i$ at the surface of clothing and the skin temperature $T_{ref}$ are obtained, and in the calculation of 3), the reference temperature $T_{in}$ at the indoor side and the temperature $T_i$ at the surface of clothing are obtained. Further, the above-mentioned calculations may be conducted in consideration of humidity.

TABLE 7

<Equation of heat balance at a wall surface>

$$\frac{\alpha_{ci}(T_{in} - T_i)}{\text{Amount of convective heat transfer}} + \frac{Q_{r_i(net)}}{\text{Amount of radiative heat transfer}} + \frac{I_i}{\text{Amount of absorption of solar radiation}} + \frac{K'(T_{ref} - T_i)}{\text{Amount of heat transfer at the outdoor side}} = 0$$

| | |
|---|---|
| i[—]: | Number of surface element |
| $T_{in}$[° C.]: | Reference temperature at the indoor side |
| $\alpha_{ci}$[W/m² · ° C.]: | Convective heat transfer coefficient |
| K'[W/m² · ° C.]: | Heat transfer coefficient between indoor side wall surface and the reference temperature at the outdoor side |
| $I_i$[W/m²]: | Amount of absorption of solar radiation |
| $T_{ref}$[° C.]: | Reference temperature at the outdoor side |
| $T_i$[° C.]: | Temperature of wall surface |

TABLE 7-continued $Q_{r_j(net)}[W/m^2]$: Amount of radiative heat transfer
("Net" is a balance between a received radiation and
a generating radiation.)

<Heat balance at the surface of clothing>

1) Convection field → radiation field $\alpha_{ci}(T_{in} - T_i) + Q_{r_j(net)} + I_i + K'(T_{ref} - T_i) = 0$ K'[W/m² · ° C.]: Heat transfer coefficient of clothing
$T_{in}$[° C.]: Reference temperature at the indoor side
$T_{ref}$[° C.]: Skin temperature
2) Convergence calculation of thermo-regulation model
Same as 1)
3) Radiation field → Convection field
Same as 1)

Particulars of calculating the thermo-regulation model in 2) are shown in Table 8. Here, the equation of heat balance is applied to all surface elements of the surface model of human shape.

TABLE 8

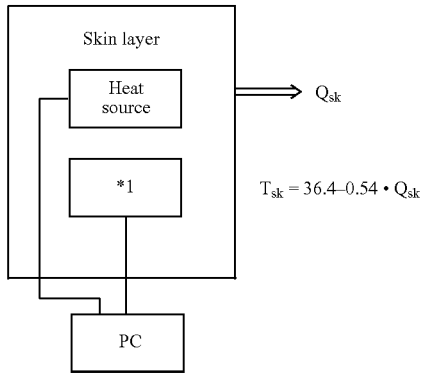

*1: Temperature sensor

The equation of heat balance comprises $Q_{sk}$ as a sensible heat loss, 36.4° C. as the inner temperature of thermal manikin and 1/0.054 (W/m²k) as the heat transfer coefficient of a portion from the position at which the inner temperature is determined to the skin surface. Accordingly, the calculation of the thermo-regulation of the thermal manikin is conducted by keeping a balance between the skin temperature $T_{sk}$ of the thermal manikin and the sensible heat loss $Q_{sk}$. In this model, it is unnecessary to conduct the simulation of heat transport by perspiration or blood flow as required in the 65MN model, and the construction of a mathematical model can be simplified to thereby reduce the amount of the calculation. Further, in order to simplify further the thermo-regulation of the thermal manikin, an amount of heat generation by a heat source may be adjusted so that the temperature of the skin layer of the thermal manikin is constant or an amount of heat generation by the heat source may be constant, or perspiration or breath may be considered.

Figure 13:
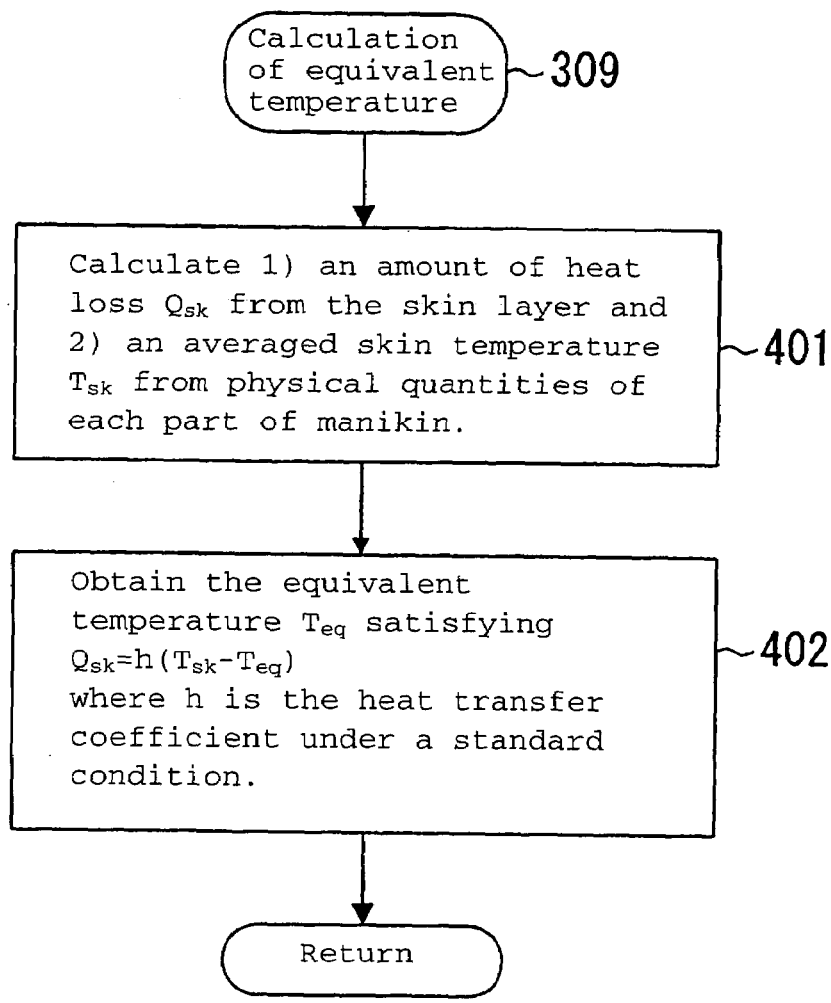
FIG. 13 is a flow chart showing the detail of Step 309.

After the above-mentioned series of calculations are made in the operation part 11a in FIG. 1, the calculation of the equivalent temperature (Step 309) is made. FIG. 13 shows a flow chart showing particulars of Step 309. First, 1) an amount of heat loss from the skin surface and 2) an averaged skin temperature are calculated from physical quantities of each part of human body (Step 401). Finally, the equivalent temperature at the skin surface of the thermal manikin is calculated by solving the equation shown in Step 402.

In the flow chart of FIG. 13, the equivalent temperature of the whole body is calculated. However, calculation may be conducted for each surface element or each part of the surface model of human shape. In this case, an amount of heat loss and a skin temperature (or an inner temperature) are obtained for each surface element or each part of the surface model. Thus, by calculating the skin temperature and so on for each surface element, the temperature distribution in each part can be simulated in detail and a correct thermal sensation can be calculated. These results of simulation are displayed in the display device 23 after these results are fabricated into a graph, a Table, a still picture (or a skin temperature distribution or the like), animation or the like by the control of the evaluation part 11b in FIG. 1. The performer of the simulation can determine the thermal comfort of a translucent member based on these displays.

EXAMPLE

Now, the present invention will be described in further detail with reference to Examples. However, it should be understood that the present invention is by no means restricted to such specific Examples.

As a space to be analyzed, a vehicle body of RV (recreational vehicle) type is assumed. A result of simulation in a case that a passenger is on the driver's seat, is shown.

FIG. 14 is a diagram showing the shape of a vehicle 50. The vehicle accommodates a thermal manikin 51 as a passenger. A simulation was conducted under calculation conditions that the passenger compartment of the vehicle was subjected to cooling and air-conditioning in midsummer, date was August 31, the location was Tokyo, the time was 16:00 and the vehicle was running in a direction of around west at 40 km/hr at an outer temperature of 33° C. The thermal manikin 51 was assumed to wear a typical summer clothing.

In order to reproduce an outdoor condition in an artificial climate control room, 36 infrared lamps were disposed in front of the vehicle body 50 so as to provide the same amount of solar radiation to the horizontal plane in an outdoor space. Then, simulation was conducted by irradiating light beams of these lamps to the vehicle body 50.

Table 9 shows a layout of glass sheets. Study was made on two assumed cases that green grass was used for all windows as standard equipment and a high-functional glass having a solar radiation controlling function was used for all windows. Table 9 describes kinds of colored glass, and thicknesses. In Table 9, data of each of two glass sheets constituting a lamination glass for the windshield are described.

TABLE 9

| | Windshield | Fornt door glass | Rear door glass | Rear quarter, rear glass |
|---|---|---|---|---|
| Case 1 (Normal type) | Green (2 mm) + green (2 mm) | Green (3.5 mm) | Green (3.5 mm) | Green (3.1 m) |
| Case 2 (Solar radiation | Green (2 mm) + green (2 mm with coating) | UV cut green (3.5 mm) | Privacy gray (3.5 mm) | Privacy gray (3.1 mm) |

TABLE 9-continued

| | Windshield | Fornt door glass | Rear door glass | Rear quarter, rear glass |
|---|---|---|---|---|
| controlling type) | | | | |

FIG. 15 shows an amount of solar radiation absorbed in the vehicle body and the surface of the human body in a case of using the solar-reduction glass. When a numerical simulation was carried out under outdoor conditions shown in FIG. 15(a), it was found that a chest portion of the thermal manikin absorbed solar radiation in an amount of as large as about 220 w/m². On the other hand, when a numerical simulation was carried out under the condition of the artificial climate control room shown in FIG. 15(b), it was found that the chest portion of the thermal manikin absorbed a largest amount of solar radiation of about 70 w/m². It is considered that this difference is caused due to a difference of light transmittance even though the same kind of glass is used, because there are differences of spectral properties of light sources and spectral transmission characteristics of glass.

Figure 16:
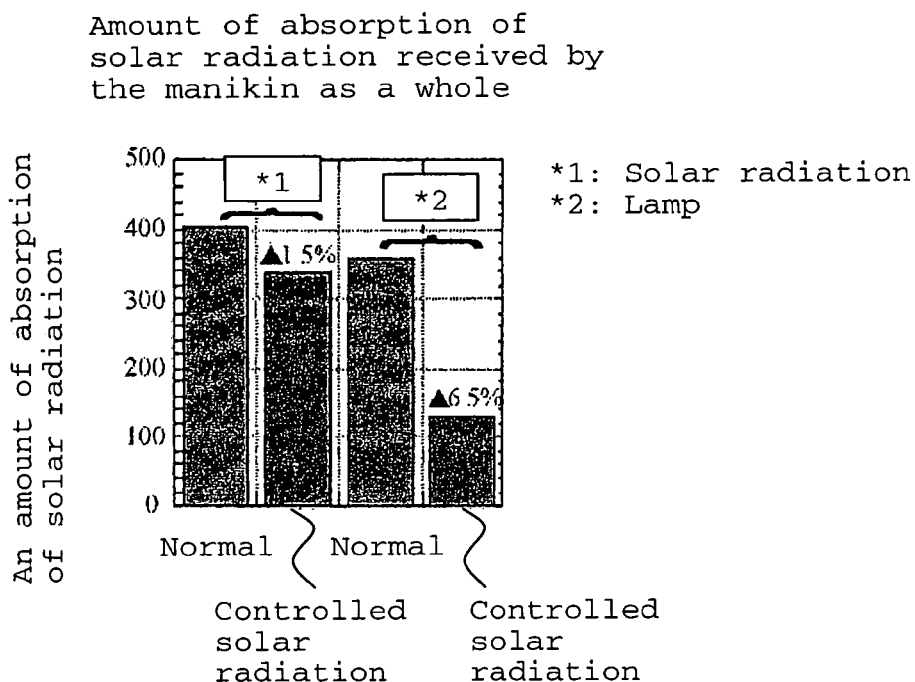
FIG. 16 is a graph showing an amount of absorptance of solar radiation received by the entirety of a manikin.

FIG. 16 is a graph showing amounts of solar radiation absorbed in a human body. Under an outdoor condition, there is a difference of 15% in the amount of solar radiation absorbed in a human body due to using different types of glass. However, under the condition of the artificial climate control room, the difference is large as about 65%.

Figure 17:
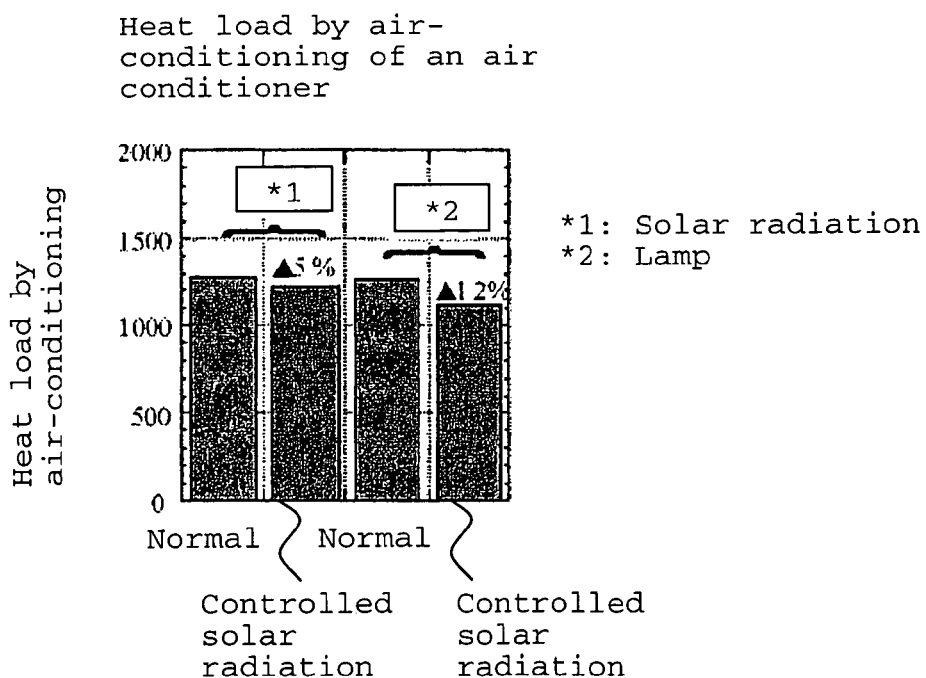
FIG. 17 is a graph showing a heat load by an air conditioner.

FIG. 17 is a graph showing heat loads by air-conditioning. Under an outdoor condition, there is found a difference of about 5% in the heat load by air-conditioning due to using different types of glass. However, under the condition of artificial climate control room, the difference is large as about 12%.

Figure 18:
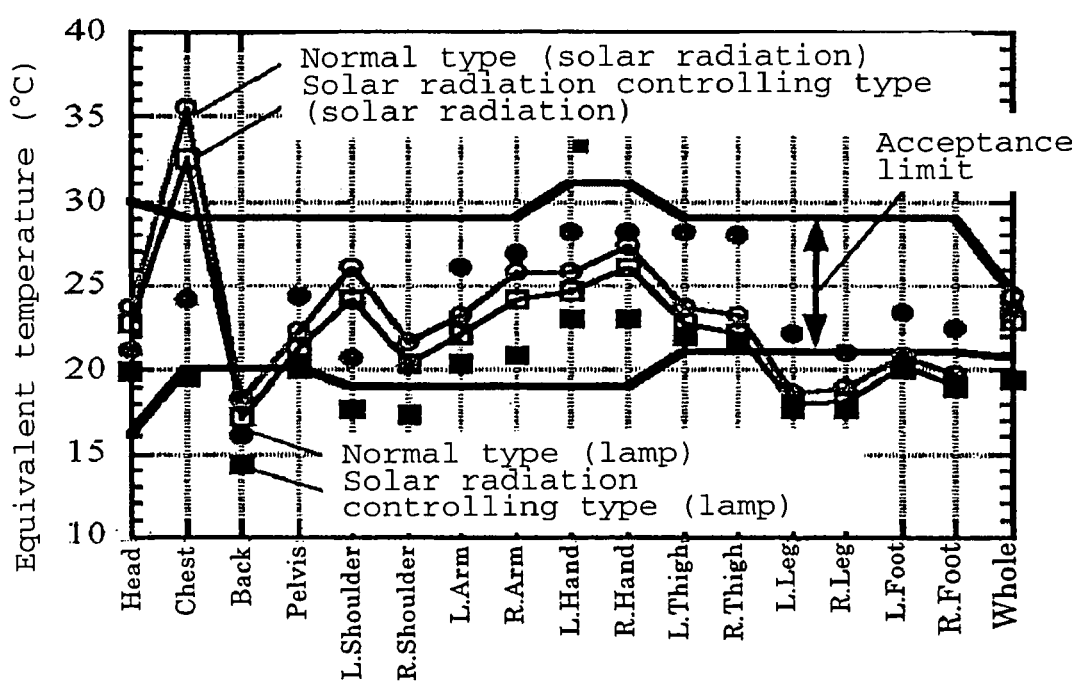
FIG. 18 is a graph showing a result of numerical experiments.

FIG. 18 is a graph showing equivalent temperatures of typical 16 parts and the whole body of a passenger on the driver's seat. Equivalent temperatures within the acceptance limit means generally comfortable. It is understood that there is a difference of about 10–15° C. depending on parts which receive solar radiation, and there is a large influence to thermal sensation because glass interrupt partially solar radiation. It is understood that the equivalent temperatures deviate from the acceptance limit under the outdoor condition even though either the glass case 1 or the glass of case 2 is used. Further, there is found a difference of about 1–3° C. in view of the equivalent temperature of the whole body. It is understood that when the high-functional glass is used under the indoor condition, the equivalent temperature is slightly lower than the acceptance limit, and it provides a thermal sensation of "slightly cool".

As is clear from the above-mentioned explanation, it was confirmed that the same result as the case using the conventional thermal manikin could be obtained by conducting a numerical simulation of the thermal model of human body 30 shown in FIG. 5 by using a computer, without conducting measurements using the thermal manikin.

Although explanation has been made as to an example using the glass sheets as a translucent member, the present invention is not limited to such example but is applicable to, for instance, an organic resin plate (a polycarbonate plate, an acrylic plate etc.) or an organic resin film usable for organic glass, vinyl houses and so on. Further, as the standard effective temperature for a human body, a standard effective temperature obtained by evaluating and calculating influence of each part more precisely than 65MN SET* may be used.

Further, description has been made as to the simulation conducted in a steady state. However, it is understood that a simulation in an unsteady state can be carried out by applying the above-mentioned series of procedure for each predetermined time step. For example, when the thermal comfort of a glass sheet used for a vehicle is to be evaluated, it is considered that the time step is determined to be a range of from several sec to several min, and calculation is conducted over a range of from several min to several ten min (or several hr).

The translucent member in the present invention includes members to be attached to a structure to introduce light therein, such as a single glazing glass, an insulated glazing glass, a lamination glass comprising an organic resin film (a polyvinyl butyral film or the like) and a plurality of glass sheets sandwiching the organic resin film, an organic resin film or an organic resin plate. The translucent member is not necessarily completely transparent. For example, glass colored by adding iron, cobalt or the like to absorb heat or a thin metallic film may be coated thereon to reflect heat wave.

Further, as the translucent member, a flat plate or curved plate is generally used. However, it may have another shape as long as it has function to introduce light. Further, description has been made on the assumption that the humidity in the indoor space is constant in order to simplify explanation. However, it is clear that the humidity can be calculated for each of the cubic elements. Further, in order to simplify calculation, a simulation may be conducted under the condition that the temperature and airflow fields in the indoor space are constant.

In addition, a simulation may be conducted in consideration of the outer configuration of the vehicle shown in FIG. 2 and ambient of the vehicle. By doing this, correct evaluation about influence of the outer configuration to the passenger's thermal comfort.

As described above, in accordance with the present invention, the material property of each part capable of providing the optimum thermal comfort can be obtained by a numerical simulation of thermal comfort index of a measuring device having a shape imitating a human shape, located in an indoor space or a passenger compartment. In particular, when calculation of the thermo-regulation of a thermal manikin is carried out by (a) adjusting an amount of heat generated from a heat source so that the temperature of a skin layer of the thermal manikin is constant, (b) making an amount of heat generated from the heat source constant, or (c) balancing the temperature of the skin layer of the thermal manikin with a sensible heat loss at the surface of the skin layer, the simulation of the thermo-regulation function can be conducted more easier than the case of using a high-grade thermo-regulation model such as the 65MN model or the like. Namely, it is unnecessary to conduct a simulation of the heat transport by perspiration or blood flow as required in the 65MN model, and the construction of a mathematical model can be simplified to thereby reduce the amount of calculation. However, the present invention does not exclude a high-grade thermo-regulation model such as the 65MN model, and such thermo-regulation model may be selected optionally depending on the performance of computer used or accuracy of a required simulation.

Further, when the skin temperature is calculated for each surface element of a thermal manikin to calculate the thermal comfort index for each part of it, the optimum design of a structure can be made even though the indoor space or the passenger compartment is in an ununiform environment in terms of heat.

Further, the thermal comfort of a translucent member can be evaluated by only a numerical simulation, and accordingly, a labor of preparing a prototype of a structure or a vehicle can be saved. Namely, evaluation of various kinds of window glass sheets is possible by only simple operations of changing parameters of the absorptance of solar radiation, the emissivity of solar radiation and so on. Further, since it is unnecessary to prepare the prototype, the thermal comfort of the translucent member can be evaluated in a shorter time and at a low cost in comparison with the conventional technique.

Further, the present invention can be employed in order to develop new material for a translucent member capable of providing the most excellent thermal comfort depending on the shape of an indoor space or a passenger compartment. Further, in the present invention, since the thermal comfort of a translucent member can be expressed by an objective index, i.e., a thermal comfort index, it is possible to explain comprehensively the thermal comfort of a translucent member to building manufacturers, vehicle manufacturers, air-conditioning system manufacturers, material manufacturers, and general users. Further, it is possible to provide programs of the above-mentioned simulation or to execute the simulation through internet. Accordingly, the present invention can provide new services for evaluation of the thermal comfort of a structure or a support for designing a structure.

The entire disclosure of Japanese Patent Application No. 2002-279695 filed on Sep. 25, 2002 including specification, claims, drawings and summary is incorporated herein by reference in its entirety.

What is claimed is:

1. A method for evaluating a thermal comfort of a structure constituted by a first, to n-th parts (n is a natural number of at least two) wherein at least one of these parts is a translucent member for introducing light to the inside, the method for evaluating thermal comfort of a structure comprising:

a step (a) of preparing first data including a material property of the first part, to a material property of the n-th part, and second data including an amount of solar radiation passing through the translucent member to reach a measuring device having a shape imitating a human body part, an amount of solar radiation to the structure, an amount of convection heat transfer in the structure, an amount of radiation heat transfer in the structure, humidity in the structure and/or a thermo-regulating function of the measuring device, and calculating at least one of the amount of heat loss from the surface of the measuring device, the temperature of the measuring device and/or the wettedness at the surface of the measuring device based on at least one in each of first and second data, and a step (b) of calculating a thermal comfort index of the measuring device by using a result of the above calculation, wherein said thermal comfort index is used to modify a design of said structure.

2. The method for evaluating thermal comfort of a structure according to claim 1, wherein said step (b) comprises:

selecting and reading the material property registered in a data base for each part, and preparing at least one combination among registered material properties;

calculating, in combined operations, at least two of the calculation of the amount of solar radiation passing through the translucent member to reach a measuring device having a shape imitating a human body part, the calculation of the amount of solar radiation to the structure, the calculation of the amount of convection heat transfer in the structure, the calculation of the amount of radiation heat transfer in the structure, the calculation of the humidity in the structure and/or the calculation of the thermo-regulating function of the measuring device with respect to each combination of material properties thus prepared;

calculating at least one of the amount of heat loss from the surface of the measuring device, the temperature of the measuring device and/or the wettedness at the surface of the measuring devices;

calculating at least one among the amount of heat loss from the surface of the measuring device, the temperature of the measuring device and/or the wettedness at the surface of the measuring device; and calculating the thermal comfort index of the measuring device by using a result of the above calculation.

3. The method for evaluating thermal comfort of a structure according to claim 1, wherein said material property is the material property of a material of each of said parts or a value indicating a shape of each of said parts.

4. The method for evaluating thermal comfort of a structure according to claim 1, wherein said measuring device includes a heat source.

5. The method for evaluating thermal comfort of a structure according to claim 1, wherein said measuring device is a thermal manikin having a thermo-regulating function.

6. The method for evaluating thermal comfort of a structure according to claim 5, wherein the thermo-regulation of the thermal manikin is carried out by (a) adjusting an amount of heat generated from a heat source so that the temperature of a skin layer of the thermal manikin is constant, (b) making the heat generated from a heat source constant, or (c) balancing the temperature of the skin layer of the thermal manikin with a sensible heat loss at the surface of the skin layer in response to ambient conditions of the thermal manikin.

7. The method for evaluating thermal comfort of a structure according to claim 5, wherein said step (b) comprises:

a step (b1) of preparing a surface model of the structure by dividing the shape of an inner surface of the structure into a plurality of surface elements, preparing a surface model of a human body by dividing the shape of an outer surface of the manikin in the structure into a plurality of surface elements and preparing an indoor space model by dividing the indoor space between the structure and the thermal manikin into a plurality of cubic elements;

a step (b2) of classifying the surface model of a human body into a plurality of parts corresponding to parts of the thermal manikin, and installing a thermo-regulation model for balancing heat generated in the thermal manikin with heat radiated from the thermal manikin in each of the parts;

a step (b3) of obtaining an amount of heat transported by the solar radiation passing through the translucent member to reach the surface model of the human body and the structure, convection in the indoor space, radiation from the surface model of the human body and radiation from the surface model of the structure by a numerical simulation based on the calculation of the indoor space model, and calculating temperature and air flow fields in the indoor space based on a result of the simulation;

a step (b4) of calculating at least one of the amount of heat loss from the skin surface of the thermal manikin, the temperature at the skin of the thermal manikin and/or the wettedness at the surface of the thermal manikin by a numerical simulation using the thermo-regulation model based on the temperature and air flow fields, the humidity around the thermal manikin, an amount of clothing on the thermal manikin and/or an amount of the activity of the thermal manikin; and a step (b5) of calculating a thermal comfort index at the skin surface of the thermal manikin by using at least one of the heat loss, the skin temperature and/or the wettedness.

8. The method for evaluating thermal comfort of a structure according to claim 1, wherein the translucent member is at least one member selected from the group consisting of a single glazing glass sheet, an insulated glazing glass sheet, a laminated glass sheet formed by sandwiching an organic resin layer by a plurality glass sheets, an organic resin layer, an organic resin plate and an organic glass sheet.

9. A thermal comfort evaluation program for a structure constituted by to n-th parts (n is a natural number of at least two) wherein at least one of these parts is a translucent member for introducing light to the inside, the thermal comfort evaluation program comprising program codes for instructing to a computer to realize the steps described in claim 1.

10. An assisting method for designing a structure in consideration of thermal comfort, the structure being constituted by first to n-th parts (n is a natural number of at least two) wherein at least one of these parts is a translucent member for introducing light to the inside, the assisting method for designing a structure comprising:

a step (a) of preparing at least one candidate value for each of the material property of a first part to the material property of an n-th part, and registering candidate values of material properties of these parts in a predetermined data base;

a step (b) of selecting and reading the material property registered in said data base for each part, and preparing at least one combination among the registered material properties;

calculating at least one of the amount of heat loss from the surface of a measuring device, the temperature of the measuring device and/or the wettedness at the surface of the measuring device based on at least one in each of data including combinations of material properties thus prepared and data including an amount of solar radiation passing through the translucent member to reach the measuring device having a shape imitating a human body part, an amount of solar radiation to the structure, an amount of convection heat transfer in the structure, an amount of radiation heat transfer in the structure, humidity in the structure and/or a thermo-regulating function of the measuring device;

calculating a thermal comfort index of the measuring device by using a result of the above calculation; and a step (c) of selecting a combination of material properties having a value closest to the optimum thermal comfort index, wherein said thermal comfort index is used to modify a design of said structure.

11. The assisting method for designing a structure in consideration of thermal comfort according to claim 10, wherein said step (b) comprises:

selecting and reading, for each part, the material property registered in said data base, and preparing at least one combination among registered material properties;

calculating, in combined operations, at least two of the calculation of the amount of solar radiation passing through the translucent member to reach the measuring device having a shape imitating a human body part, the calculation of the amount of solar radiation to the structure, the calculation of the amount of convection heat transfer in the structure, the calculation of the amount of radiation heat transfer in the structure, the calculation of the humidity in the structure and/or the calculation of the thermo-regulating function of the measuring device with respect to each combination of material properties thus prepared;

calculating at least one of the amount of heat loss from the surface of the measuring device, the temperature of the measuring device and/or the wettedness at the surface of the measuring device;

calculating at least one among the amount of heat loss from the surface of the measuring device, the temperature of the measuring device and/or the wettedness at the surface of the measuring device; and calculating the thermal comfort index of the measuring device by using a result of the above calculation.

12. The assisting method for designing a structure in consideration of thermal comfort according to claim 10, wherein said material property is the material property of a material for each of said parts or a value indicating a shape of each of said parts.

13. The assisting method for designing a structure in consideration of thermal comfort according to claim 10, wherein said measuring device includes a heat source.

14. The assisting method for designing a structure in consideration of thermal comfort according to claim 10, wherein said measuring device is a thermal manikin having a thermo-regulating function.

15. The assisting method for designing a structure in consideration of thermal comfort according to claim 14, wherein the thermo-regulation of the thermal manikin is carried out by (a) adjusting an amount of heat generated from a heat source so that the temperature of a skin layer of the thermal manikin is constant, (b) making the heat generated from the heat source constant, or (c) balancing the temperature of the skin layer of the thermal manikin with a heat loss at the surface of the skin layer in response to ambient conditions of the thermal manikin.

16. The assisting method for designing a structure in consideration of thermal comfort according to claim 14, wherein said step (b) comprises:

a step (b1) of preparing a surface model of the structure by dividing the shape of an inner surface of the structure into a plurality of surface elements, preparing a surface model of a human body by dividing the shape of an outer surface of the manikin in the structure into a plurality of surface elements and preparing an indoor space model by dividing the indoor space between the structure and the thermal manikin into a plurality of cubic elements;

a step (b2) of classifying the surface model of human body into a plurality of parts corresponding to parts of the thermal manikin, and installing a thermo-regulation model for balancing heat generated in the thermal manikin with heat radiated from the thermal manikin in each of the parts;

a step (b3) of obtaining an amount of heat transported by the solar radiation passing through the translucent member to reach the surface model of the human body and the structure, convection in the indoor space, radiation from the surface model of the human body and radiation from the surface model of the structure by a numerical simulation based on the calculation of the indoor space model, and calculating temperature and air flow fields in the indoor space based on a result of the simulation;

a step (b4) of calculating at least one of the amount of heat loss from the skin surface of the thermal manikin, the temperature at the skin of the thermal manikin and/or the wettedness at the surface of the thermal manikin by the numerical simulation using the thermo-regulation model based on the temperature and air flow fields, the humidity around the thermal manikin, an amount of clothing on the thermal manikin and/or an amount of the activity of the thermal manikin; and a step (b5) of calculating a thermal comfort index at the skin surface of the thermal manikin by using at least one of the heat loss, the skin temperature and/or the wettedness.

17. The assisting method for designing a structure in consideration of thermal comfort according to claim 10, wherein the translucent member is at least one member selected from the group consisting of a single glazing glass sheet, an insulated glazing glass sheet, a laminated glass sheet formed by sandwiching an organic resin layer by a plurality glass sheets, an organic resin layer, an organic resin plate and an organic glass sheet.

18. The assisting method for designing a structure in consideration of thermal comfort according to claim 10, wherein the material property of the translucent member is determined by a combination of the transmittance of solar radiation, the absorptance of solar radiation, the emissivity and the overall heat transfer coefficient.

19. The assisting method for designing a structure in consideration of thermal comfort according to claim 10, wherein said thermal comfort index is a comfort index based on equivalent temperature, standard effective temperature, predicted mean vote or a modified value of the standard effective temperature.

20. The assisting method for designing a structure according to claim 10, wherein said structure has at least one selected from the group consisting of a heating, ventilation and air conditioning system, a radiation cooling/heating panel system, a ventilation system and a humidity controlling system, and said thermal comfort index is calculated in consideration of the selected system.

21. An assisting program for designing a structure constituted by first to n-th parts (n is a natural number of at least two) wherein at least one of these parts is a translucent member for introducing light to the inside, the assisting program for designing a structure comprising program codes for instructing to a computer to realize the steps described in claim 10.

22. A thermal comfort evaluation system for a structure constituted by first to n-th parts (n is a natural number of at least two) wherein at least-one of these parts is a translucent member for introducing light to the inside, the thermal comfort evaluation system for a structure comprising:

means for preparing first data including the material property of the first part to the material property of the n-th part, and second data including an amount of solar radiation passing through the translucent member to reach a measuring device having a shape imitating a human body part, an amount of solar radiation to the structure, an amount of convection heat transfer in the structure, an amount of radiation heat transfer in the structure, humidity in the structure and/or a thermo-regulating function of the measuring device, and calculating at least one of the amount of heat loss from the surface of the measuring device, the temperature of the measuring device and/or the wettedness at the surface of the measuring device based on at least one in each of first and second data; and means for calculating a thermal comfort index of the measuring device by using a result of the above calculation, wherein said thermal comfort index is used to modify a design of said structure.

23. An assisting system for designing a structure constituted by first to n-th parts (n is a natural number of at least two) wherein at least one of these parts is a translucent member for introducing light to the inside, the assisting system for designing a structure comprising:

(a) means for preparing at least one candidate value for each of the material property of the first part to the material property of the n-th part, and registering candidate values of material properties of these parts in a predetermined data base;

(b) means for selecting and reading the material property registered in said data base for each part and preparing at least one combination among the registered material properties based on, calculating at least one of the amount of heat loss from the surface of a measuring device, the temperature of the measuring device and/or the wettedness at the surface of the measuring device based on at least one in each of data including combinations of material properties thus prepared and data including an amount of solar radiation passing through the translucent member to reach the measuring device in a form of a human body part, an amount of solar radiation to the structure, an amount of convection heat transfer in the structure, an amount of radiation heat transfer in the structure, humidity in the structure and/or a thermo-regulating function of the measuring device, and calculating a thermal comfort index of the measuring device by using a result of the above calculation; and (c) means for selecting a combination of material properties having a value closest to the optimum thermal comfort index, wherein said thermal comfort index is used to modify a design of said structure.

\* \* \* \* \*